United States Patent [19]

Ohara

[11] Patent Number: 5,744,799

[45] Date of Patent: Apr. 28, 1998

[54] APPARATUS FOR AND METHOD OF REAL-TIME NANOMETER-SCALE POSITION MEASUREMENT OF THE SENSOR OF A SCANNING TUNNELING MICROSCOPE OR OTHER SENSOR SCANNING ATOMIC OR OTHER UNDULATING SURFACES

[76] Inventor: Tetsuo Ohara, 12 Lindall Place, #4, Boston, Mass. 02114

[21] Appl. No.: 650,168

[22] Filed: May 20, 1996

[51] Int. Cl.[6] .................................................. H01J 37/26
[52] U.S. Cl. ................................... 250/306; 250/307
[58] Field of Search ........................... 250/360, 307, 250/423 F; 73/105

[56] References Cited

U.S. PATENT DOCUMENTS

| | | | |
|---|---|---|---|
| 5,239,863 | 8/1993 | Kudo et al. | 250/306 |
| 5,245,187 | 9/1993 | Kawase et al. | 250/306 |
| 5,270,543 | 12/1993 | Visser et al. | 250/306 |
| 5,356,218 | 10/1994 | Hopson et al. | 250/306 |
| 5,496,999 | 3/1996 | Linker et al. | 250/306 |
| 5,507,179 | 4/1996 | Gamble et al. | 250/306 |
| 5,537,372 | 7/1996 | Albrecht et al. | 250/306 |
| 5,589,686 | 12/1996 | Ohara | 250/306 |

*Primary Examiner*—Kiet T. Nguyen
*Attorney, Agent, or Firm*—Rines and Rines

[57] ABSTRACT

A method of and apparatus for producing improved real-time continual nanometer scale positioning data of the location of sensing probe used with one of a scanning tunneling microscope, an atomic force microscope, or a capacitive or magnetic field-sensing system, for measuring the probe distance and the position relative to an atomic surface or other periodically undulating surface such as a grating or the like moving relatively with respect to the probe, and between which and the surface there exists a sensing field, through rapid oscillating of the probe under the control of sinusoidal voltages, and comparison of the phase and/or amplitude of the output sinusoidal voltages produced by current in the sensing field to provide positional signals indicative of the direction and distance off the apex of the nearest atom or undulation of the surface; and, where desired, feeding back such positional signals to control the relative movement of the probe and surface; and wherein improved operation is achieved through one or all of eliminating error caused by phase delays between the sinusoidal voltage driving the probe and its actual oscillation position, particularly when near the probe natural frequency, thereby providing for increased speed, frequency response and reliability; preventing the possible crashing of the probe into the surface and other probe-to-surface gap control problems; providing for absolute positioning; and providing for improved single and multi-probe micromachined probe design particularly of monolithic crystal wafer construction.

48 Claims, 32 Drawing Sheets

Holographic grating (one dimensional)

(1) form the protective layer on both sides of silicon wafer (2) Coat photoresist on one side and develop a probe pattern (3) Inisotropic etching (KOH)

(4) Remove the protective layer and evapolate thin metal film on the other side (5) Dice the probe and attach to the base unit (a) One dimensional position sensing with an absolute position measurement (b) Schematic drawing of the electrode location vs. grating (top view)

(b) One dimensional grating for x, θ measurement (a) Two dimensional grating (top view)

APPARATUS FOR AND METHOD OF REAL-TIME NANOMETER-SCALE POSITION MEASUREMENT OF THE SENSOR OF A SCANNING TUNNELING MICROSCOPE OR OTHER SENSOR SCANNING ATOMIC OR OTHER UNDULATING SURFACES

The present invention relates to nanometer and other inter-atomic measurements, as with scanning tunneling microscopes (STM), atomic force microscopes (AFM), and other suitable scanning sensors, being particularly concerned with improvements in sub-atomic dimension measurements of scanner or sensor position over an undulating atomic or other undulating surface, such as an undulating holographic grating, conventional diamond-cut or other-formed gratings, and surfaces of undulating fields—magnetic and electric—including also the feeding back of such real time nanometer positional measurements for surface control of the type disclosed in my prior U.S. patent application Ser. No. 08/588,651, filed Jan. 19, 1996 as a of U.S. patent application Ser. No. 08/216057, filed Mar. 22, 1994, and now U.S. Pat. No. 5,583,686, and in my article, "Real-time subnanometer position sensing with long measurement range", appearing in the IEEE International Conference on Robotics and Automation Proceedings published on May 22, 1995.

BACKGROUND OF INVENTION

As explained in my said patent applications and article, laser interferometry is currently widely used for fine measurements of a few hundredths of a light wavelength resolution in the manufacture or processing of high precision surfaces or tools, such as mirrors and lenses and the like, integrated circuit wafers, such as memory chips, and similar devices. In the manufacture of wafers and the like, for example, it is desired to proceed in the processing along parallel lines of a few sub-microns width, and it is important to know the position at all times and to ensure that the processing is taking place exactly along these lines within a few percent. Today, the tracking of position in such scanning processes as in the manufacture of wafers and the like, is effected through laser interferometry. Laser interferometers, however, are designed for one-axis measurement and require very expensive and stable laser sources, and optics. In order to get down to the order of nanometer resolution, this has to be divided into several hundred units. This subjects the system to inaccuracies since the wavelength of the laser may vary as a result of temperature variations, airflow condition changes, and so forth. Often, moreover, it is required that such high precision measurements be done in a vacuum which is expensive and cumbersome.

Other applications where very good precision is required are, for example, in the manufacture of master disks for CD-disk reproduction and the like. In the diamond machining and finishing of satellite telescopes and the like, similar orders of precision are required as well.

Particularly since the advent of scanning tunneling microscopes, described for example by G. Binnig and H. Rohrer in Helev. Phys. Acta, 55, 726 (1982), and atomic force type microscopes, as in U.S. Pat. No. 4,724,318, the imaging of atomic surfaces and the like has become readily feasible, opening the door to nanometer position resolution.

In publications by Higuchi and others, such as in "Crystalline Lattice for Metrology and Positioning Control", Proceedings IEEE Micro Electro Mechanical Systems, page 239-244, such equipment has therefore been used with an atomic surface disposed on a moving table, wherein the tunneling microscope sensor counts the number of atoms on the passing surface in the X and/or Y direction to come to different predetermined positions or locations on the surface. To effect position locking for each new position attained, the table is rotated, always being in sinusoidal vibration.

This operation, however, does not give real-time continual sensor position location measurements over the surface; and it is to the provision of such continual locations measurement that the present invention is directed, and at resolutions of the order of 0.01 nanometers and below—namely one tenth to one hundredth of the resolution of laser interferometric position measurements. The invention, furthermore, unlike Higuchi, et al, obviates the table vibration position locking and provides for position locations by sensor oscillation about a reference point. The advantages over laser interferometry, in addition to the greatly improved resolution, reside also in the obviating of the need for an optical system, its complexity and its errors due to temperature variations and the like.

The novel approach towards these ends of the invention described in my said patent applications and article embraces a method of real-time nanometer scale position location measurement of a probe scanning a periodically undulating surface such as atomic surfaces, conductive holographic gratings and other gratings and the like, as the surface and probe are relatively moved, that comprises, setting up a sensing field between the probe and the surface; oscillating the probe during said scanning about a reference origin point of the probe by a controlling sinusoidal voltage; measuring the output sinusoidal voltage generated by the sensing field during said oscillation and after passing through the surface; comparing the phase and/or amplitude of the controlling and output voltages; and developing from such comparing, positional signals, on a continual basis, indicative of the direction and distance of the probe off the apex of the nearest undulation of the surface, and thus the position of the probe along the surface.

While this represents a very substantial and useful new technique, there are applications where improvement upon the same may be desirable and/or necessary. As a first example, there are now requirements for increased speed, frequency response and reliability, particularly for semiconductor industry applications. Especially, when the probe oscillation frequency becomes close to the system natural frequency, there exists the phase delay between the input oscillation signal and the actual probe oscillation. This phase delay may be sensitive to the changes of environmental condition, and thus it can affect the precision of the position sensing. The present invention materially improves this operation.

Other problems have been found to arise when the probe is oscillated at high frequency. The gap controller has to avoid the probe crashing into the grating surface and yet to keep nanometer level distance so that it won't lose the signal. It would not be satisfactory to use a low-pass filtered (or averaged) gap distance as a feedback signal for the gap control, since it may allow the probe to touch the grating surface for very short times. Another problem is how to make sure the gap control scheme will not interfere with the position sensing process. Non-linear characteristics of the tunneling current and the atomic force vs. gap distance also present a challenging problem to achieve a high performance gap control system. While simple linearization mapping is a common practice, this control scheme may even increase the chance of an accidental probe crash to the grating surface.

The total motion range of the sensor probe has to be larger than the total motion of the sample surface in order to compensate for the effects of kinematic error and/or other mechanical error in the system. Usually such range exceeds the range of voltage which an ordinary Digital to Analog Converter (D/A) chip can provide. Common practice is to amplify the D/A output, but this also amplifies the noise as well, and reduces the system resolution. The present invention improves upon these difficulties also.

Traditionally, in the field of Scanning Tunneling Microscopes (STM), etched metal wire has been used as a probe. Although micromachined probes are common practice for Atomic Force Microscopes for easy mass production and precise reproduction of the mechanical characteristic, these probes are not generally conductive and they have their lowest natural frequency along the probe axis (Z axis) direction. Thus, when such probe is oscillated in the X direction, vibrational noise in the Z direction has been found to be induced, making the position measurement dysfunctional. This further problem is also addressed by the present invention.

Some industrial applications require an absolute position sensing such that even if there were to be a power failure, the process does not have to start over. Definition of the origin can be important for similar reasons. Heretofore, however, it has not been an easy task to obtain such functions with nanometer or subnanometer precision. It is very important to set-up the system properly if nanometer order precision is required. The set-up conditions, such as the angle between the probe and the grating surface, the grating surface slope and probe oscillation amplitude all affect the precision of the position sensing significantly, but heretofore there have not been simple methods to verify the conditions.

Currently, the response speed of the new invention is determined by a relatively slow natural frequency of the mechanical device. If further position measurement speed is required, new approach may be necessary.

OBJECTS OF INVENTION

It is accordingly an object of the present invention to provide a new and improved method of and apparatus for nanometer scale real-time sensor position measurement (and control) on atomic surfaces, gratings and the like, with scanning tunneling microscopes, and atomic force microscopes and the like, that obviate one or more of the above-described phase delay, probe crash avoidance, gap control and probe construction and operational difficulties, and limitations.

Other and further objects will be explained hereinafter and are more particularly delineated in the appended claims.

SUMMARY

In summary, from one of its important aspects, the improved present invention embraces a method of real-time nanometer scale position location measurement of a probe scanning a periodically undulating surface as the surface and probe are relatively moved, that comprises, setting up a sensing field between the probe and the surface; oscillating the probe during said scanning about a reference origin point of the probe by a controlling sinusoidal voltage; measuring the output sinusoidal voltage generated by the sensing field during said oscillation and after passing to the surface; comparing the phase and/or amplitude of the controlling and output voltages by multiplying said output sinusoidal voltage by said controlling sinusoidal voltage; developing from such comparing, positional signals, on a continual basis, indicative of the direction and distance of the probe off the apex of the nearest undulation of the surface, and thus the position of the probe along the surface and eliminating any phase delay between the controlling sinusoidal voltage and the actual probe oscillation.

Novel sub-sets and sub-combinations are also hereinafter described and claimed, as are preferred and best mode embodiments and designs.

DRAWINGS

The invention will now be described with reference to the accompanying drawings, FIGS. 1–10(b) of which are reproductions of the corresponding figures of my prior said patent applications, and FIGS. 11(a)–21 are more particularly directed to the improvements of the present invention.

Figure 7:
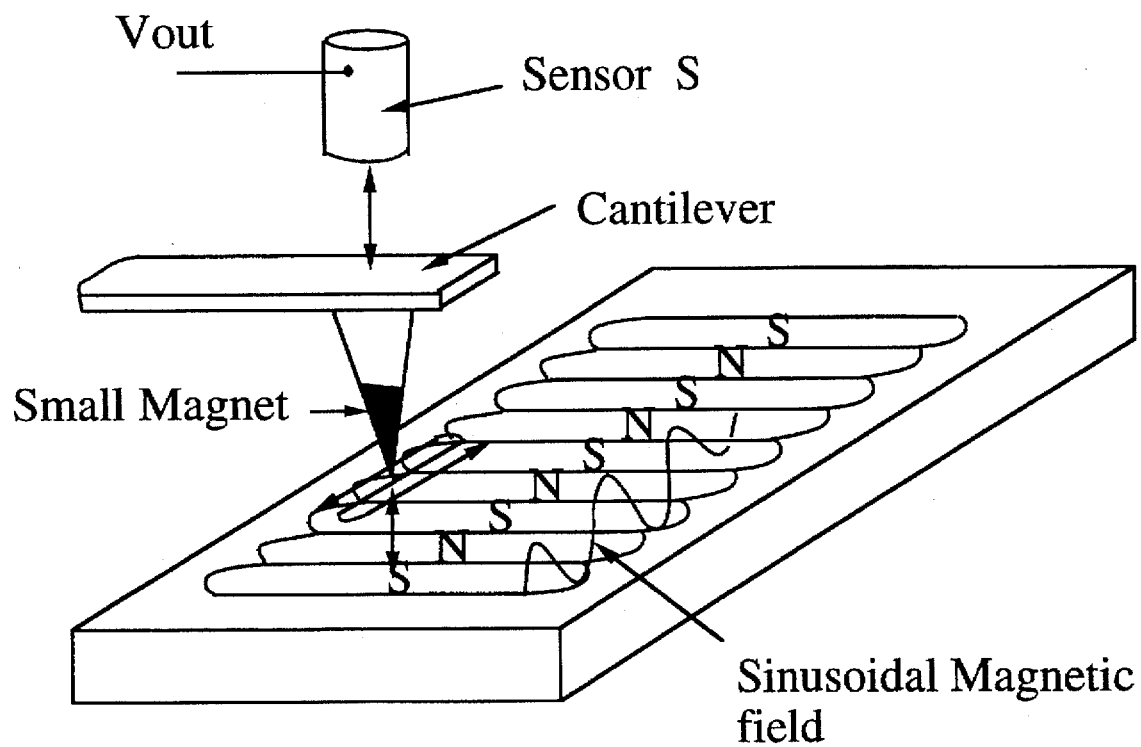
Figure 7:
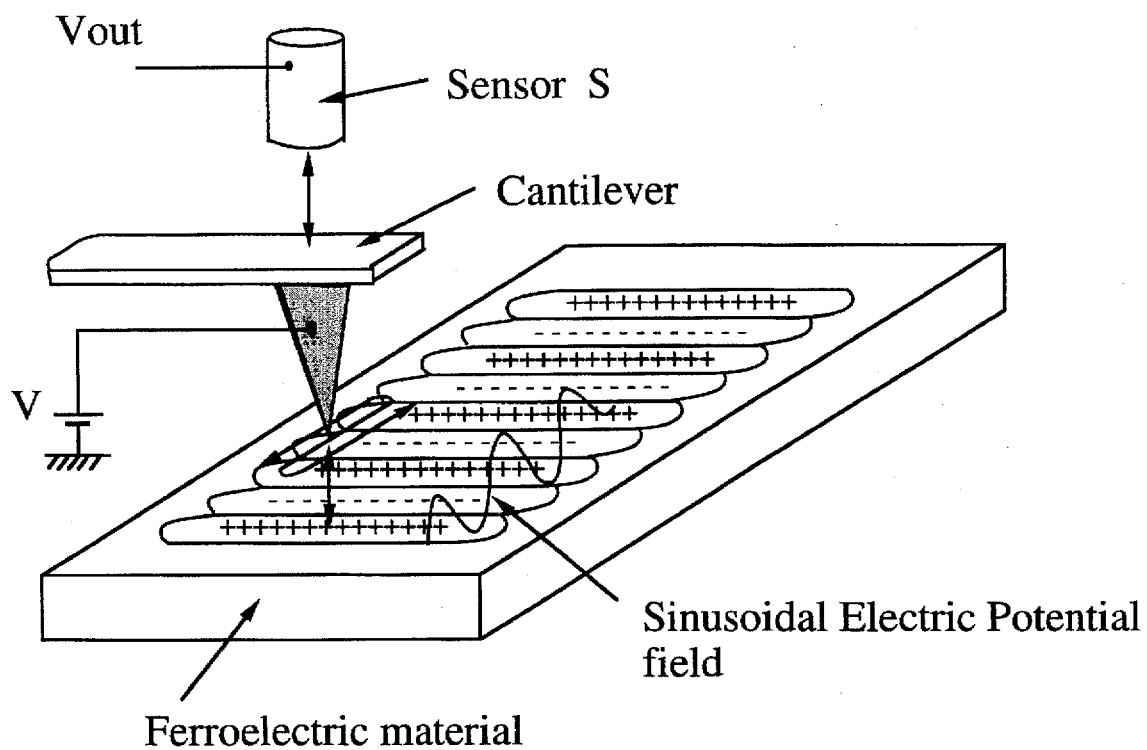
Figure 8:
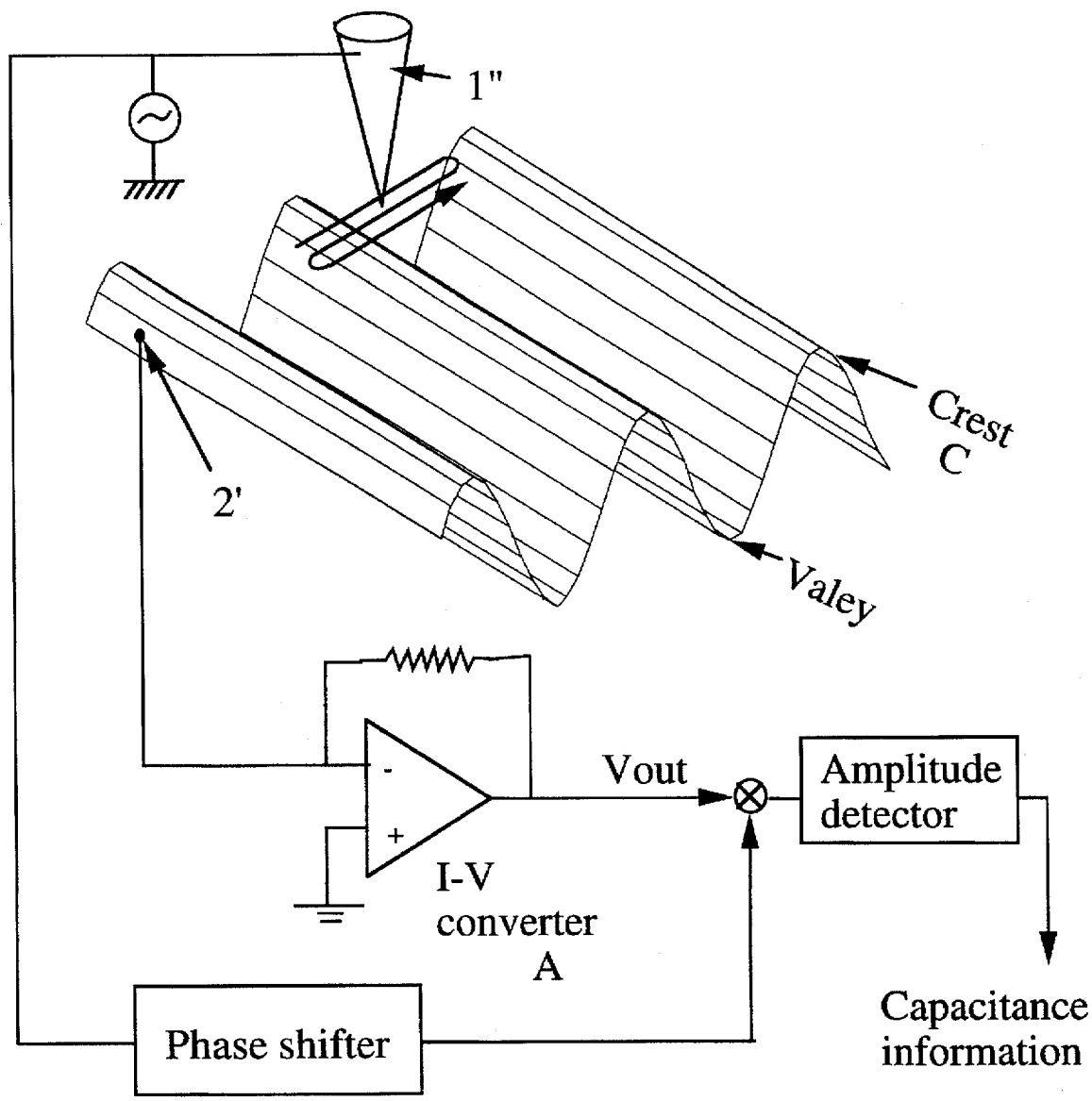
Figure 9:
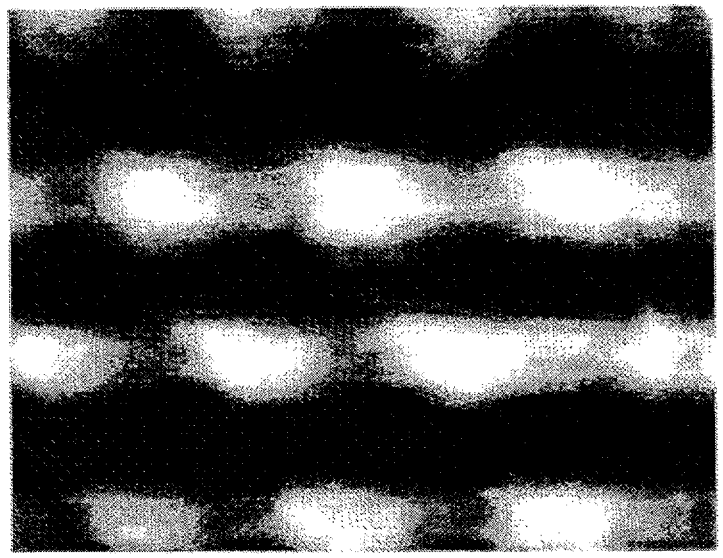
Figure 10A:
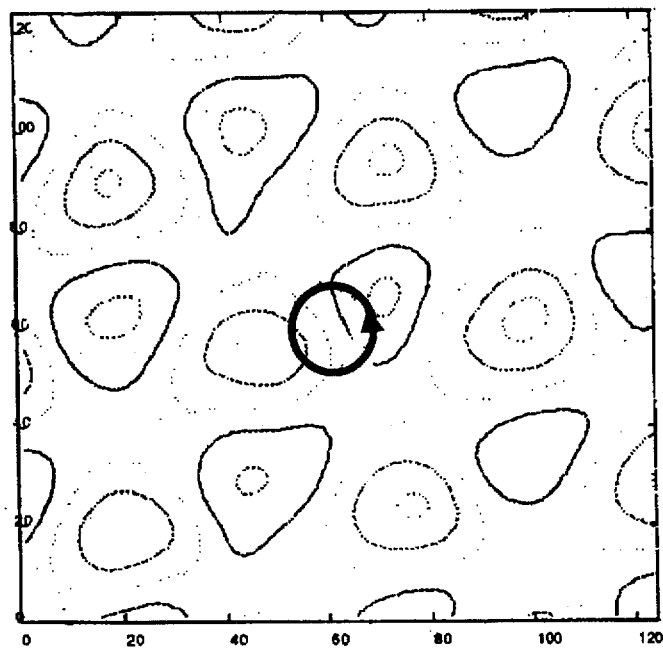
Figure 10B:
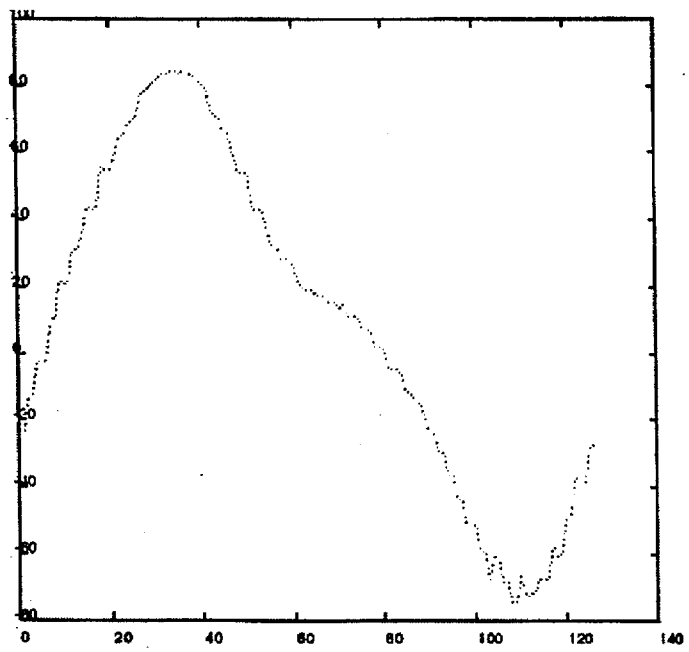
Figure 11A:
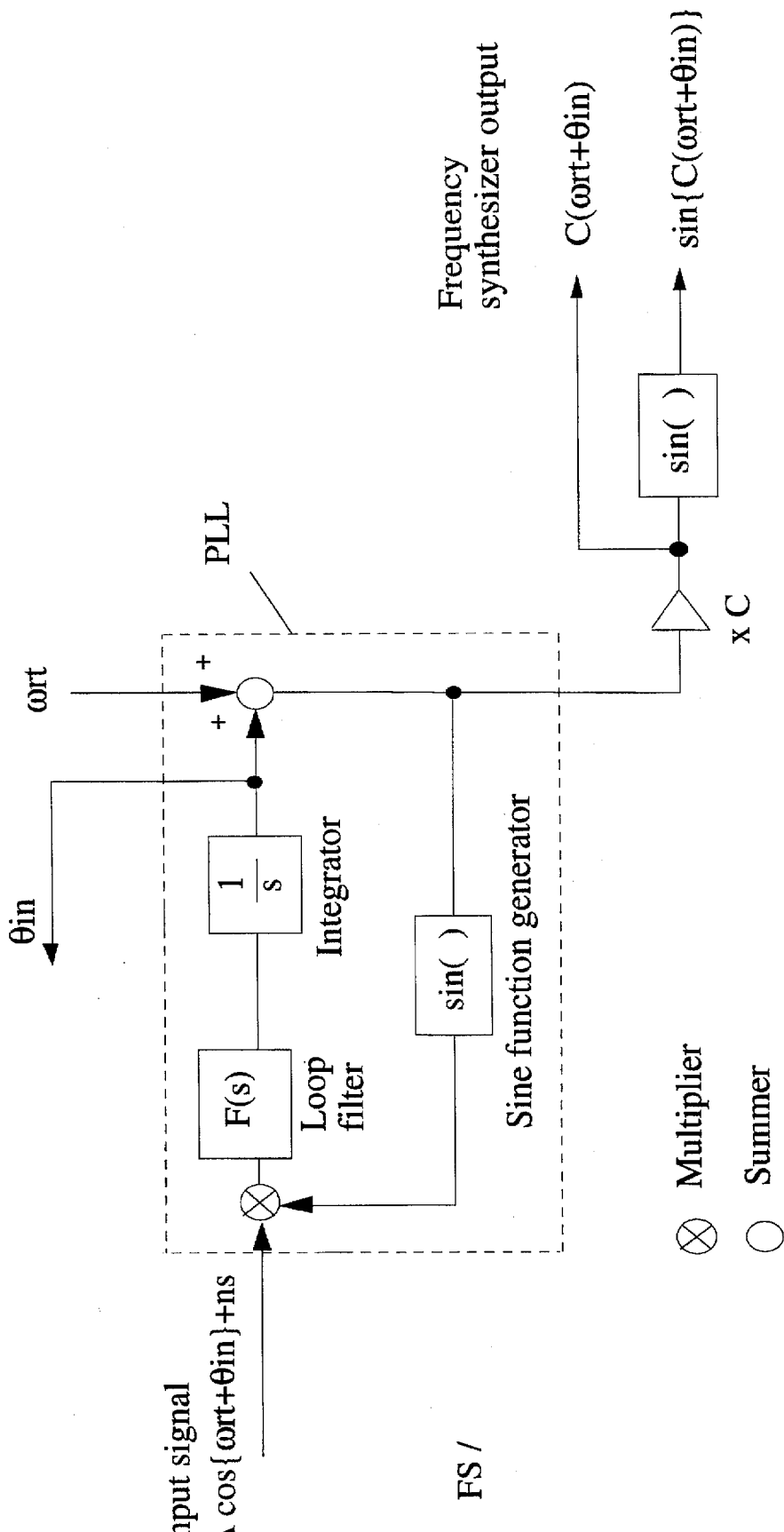
Figure 11B:
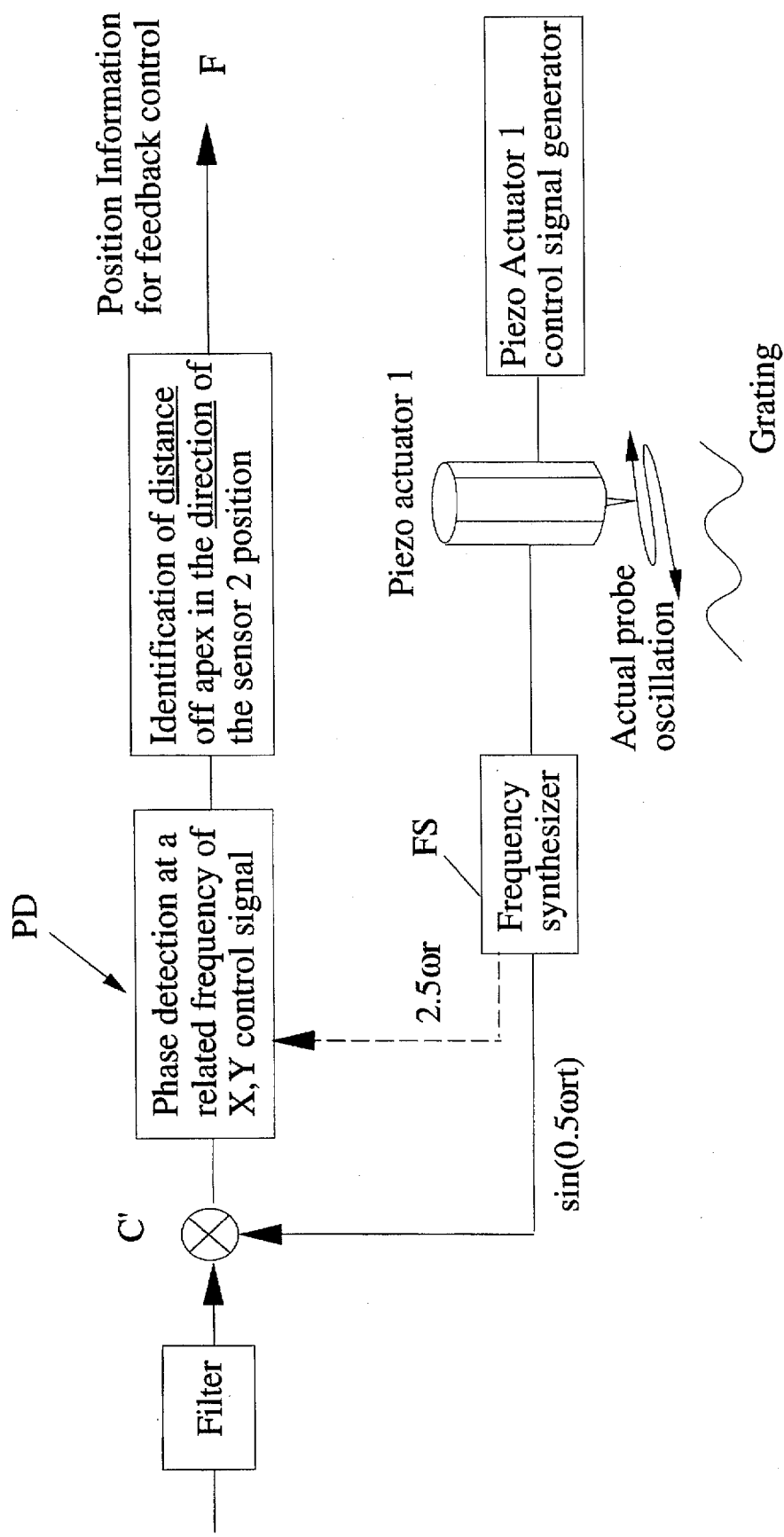
Figure 12:
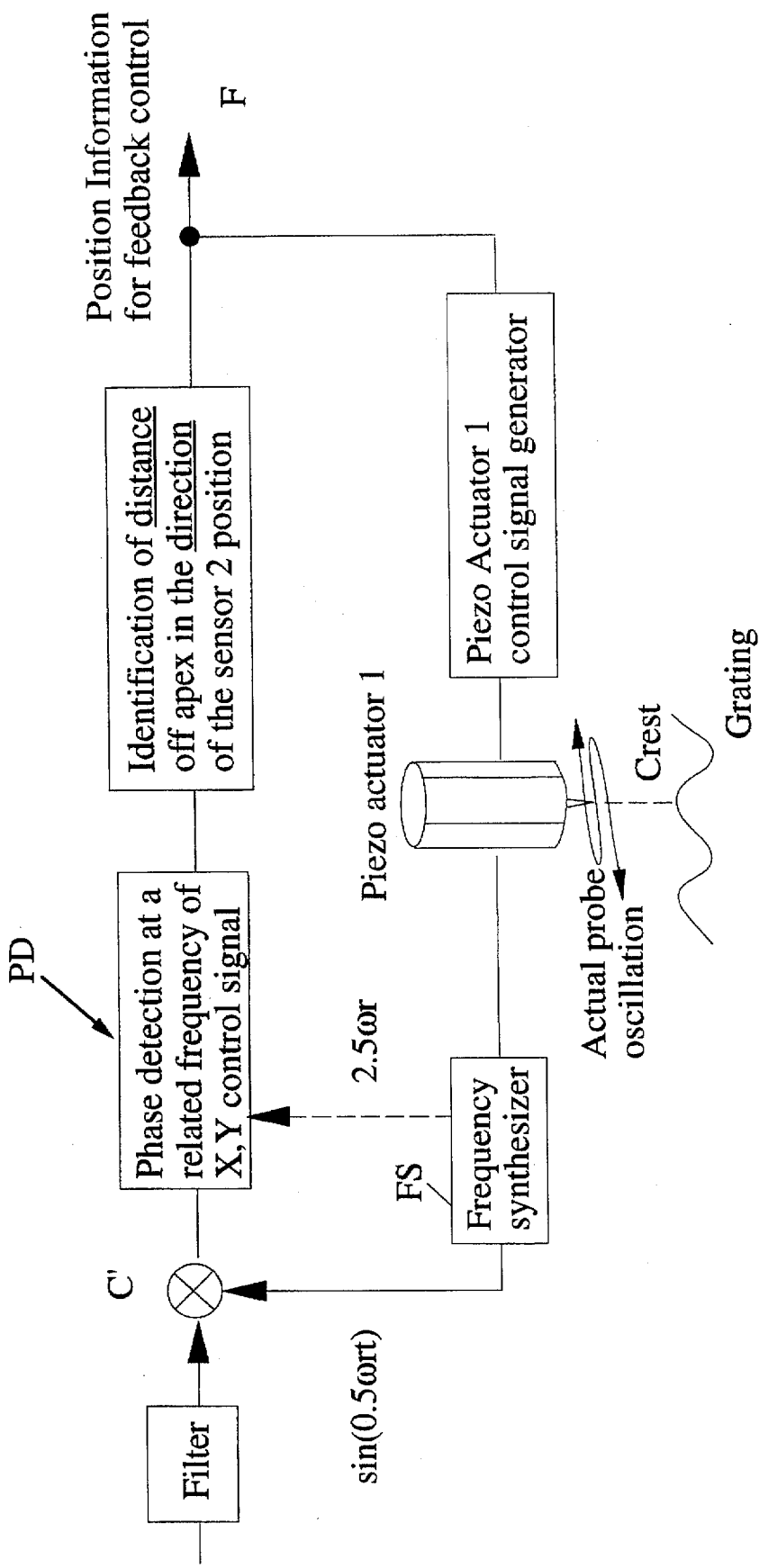
Figure 13A:
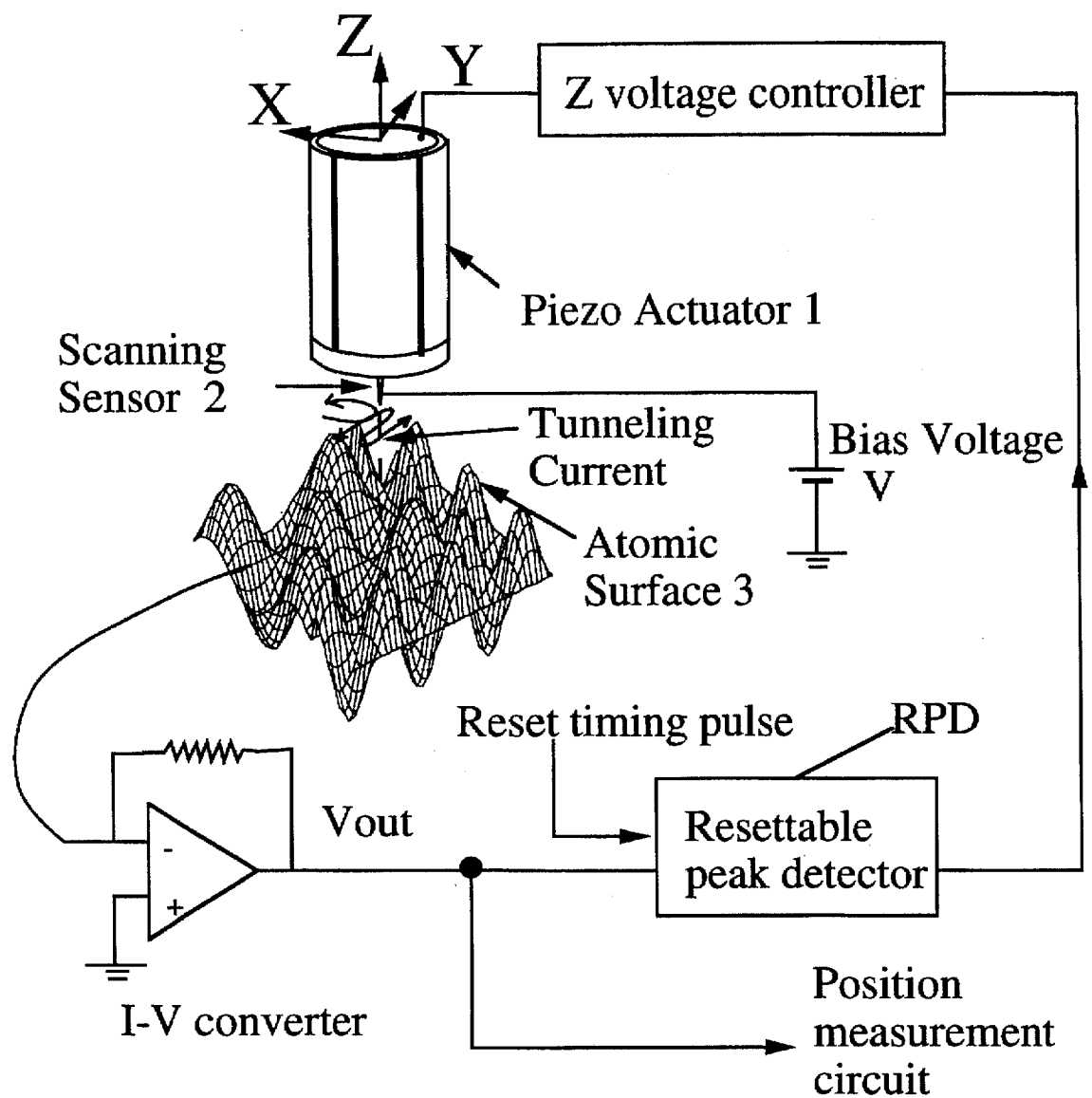
Figure 13B:
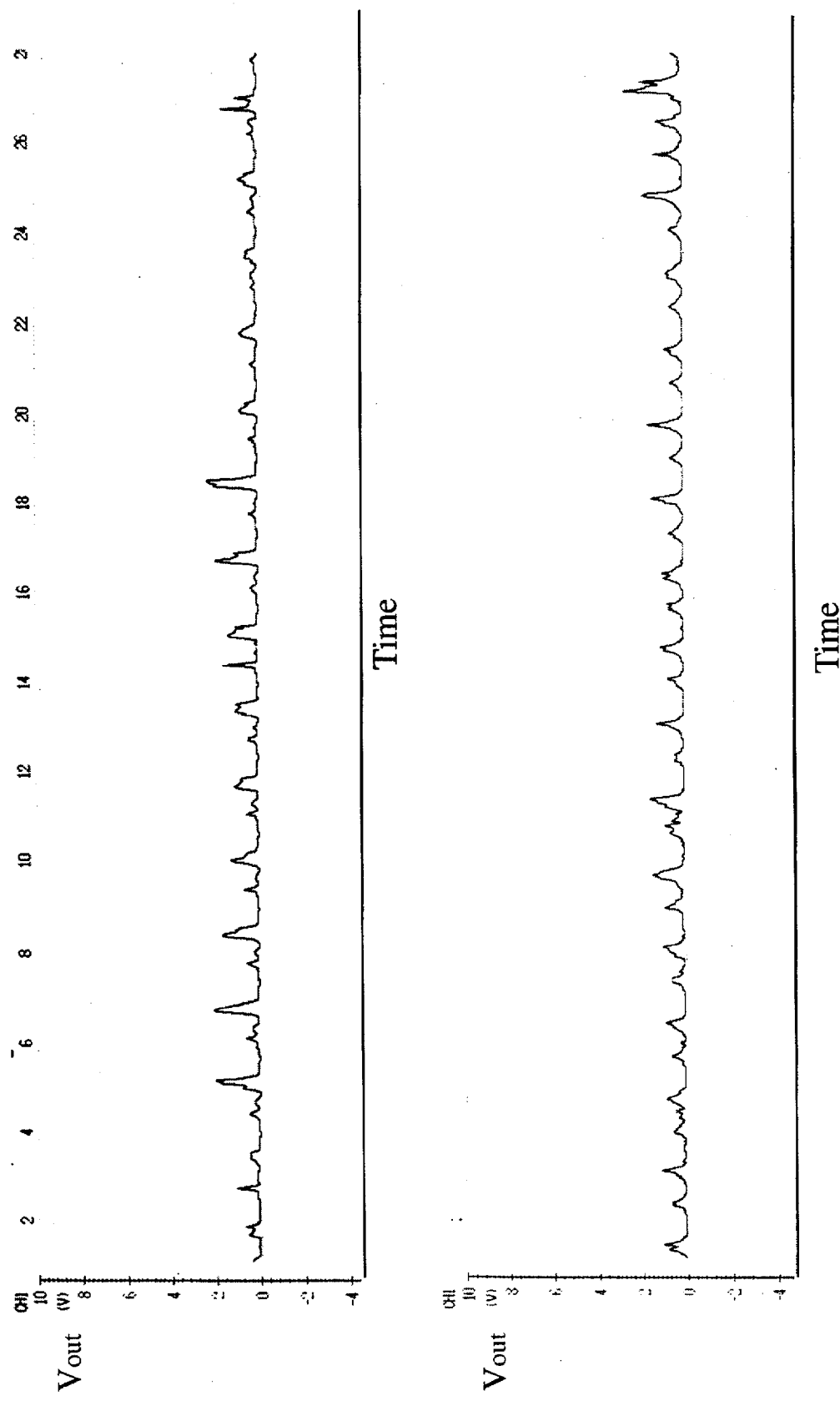
Figure 14A:
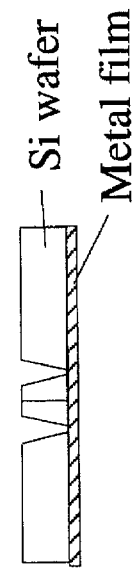
Figure 14A:
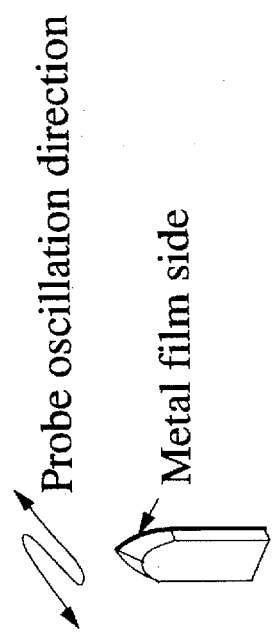
Figure 14A:
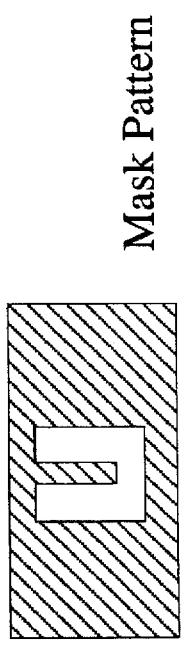
Figure 14A:
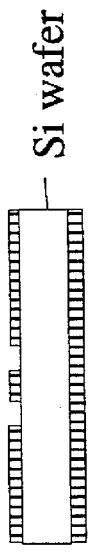
Figure 14A:
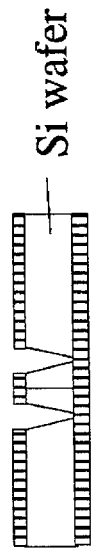
Figure 14B:
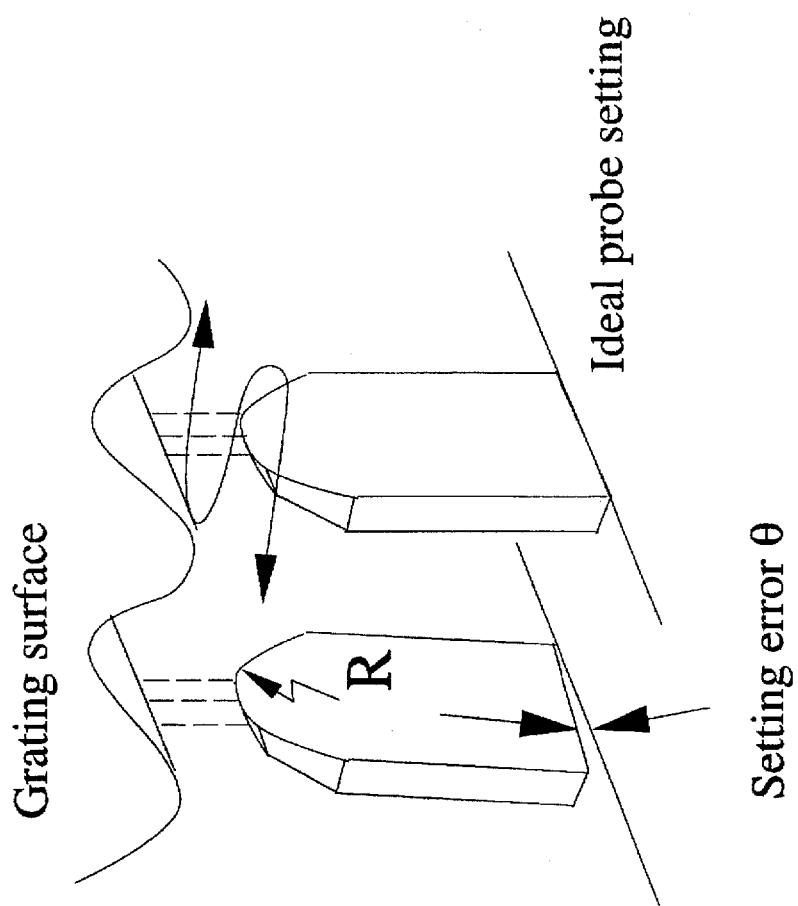
Figure 15:
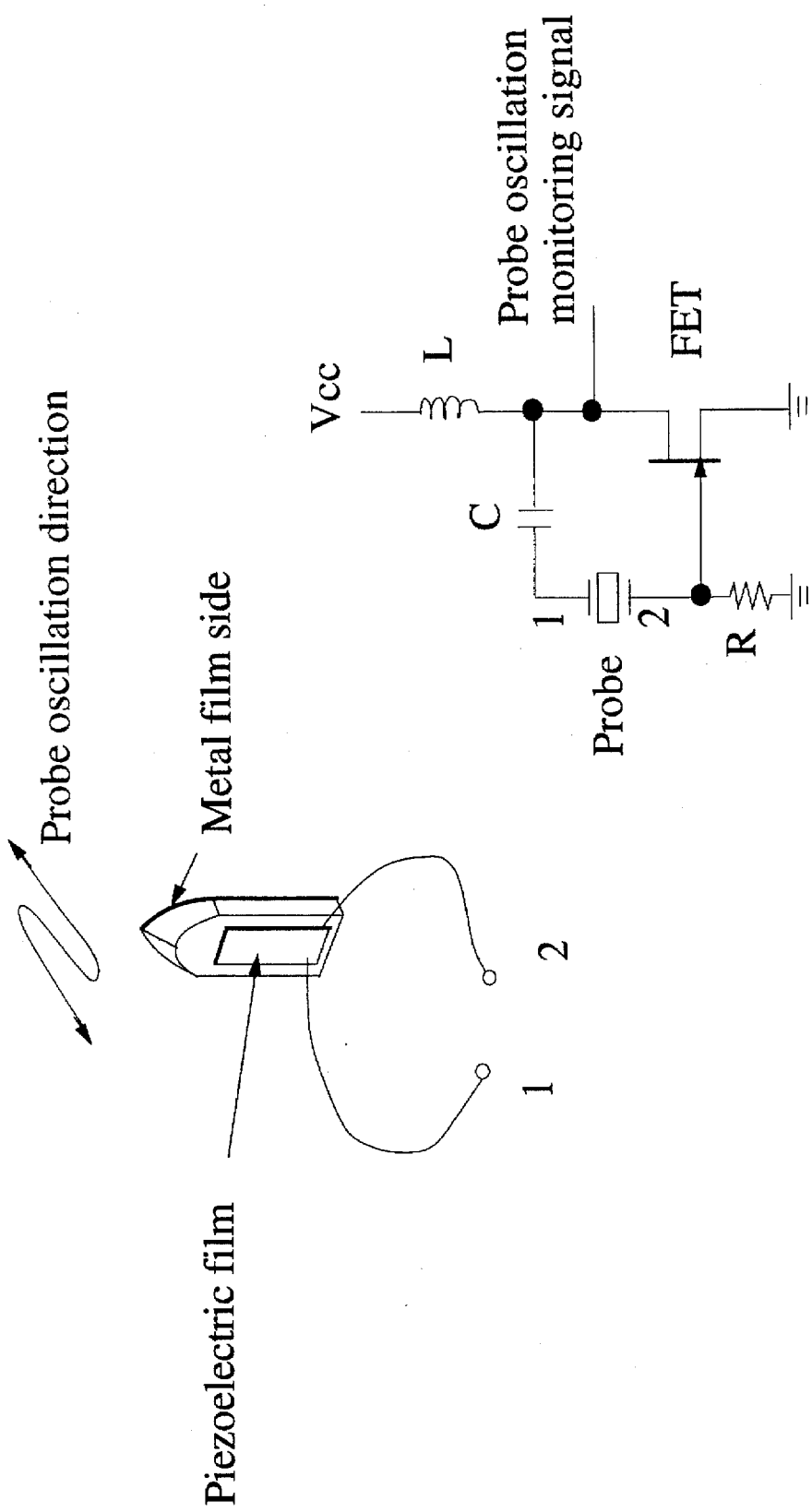
Figure 16:
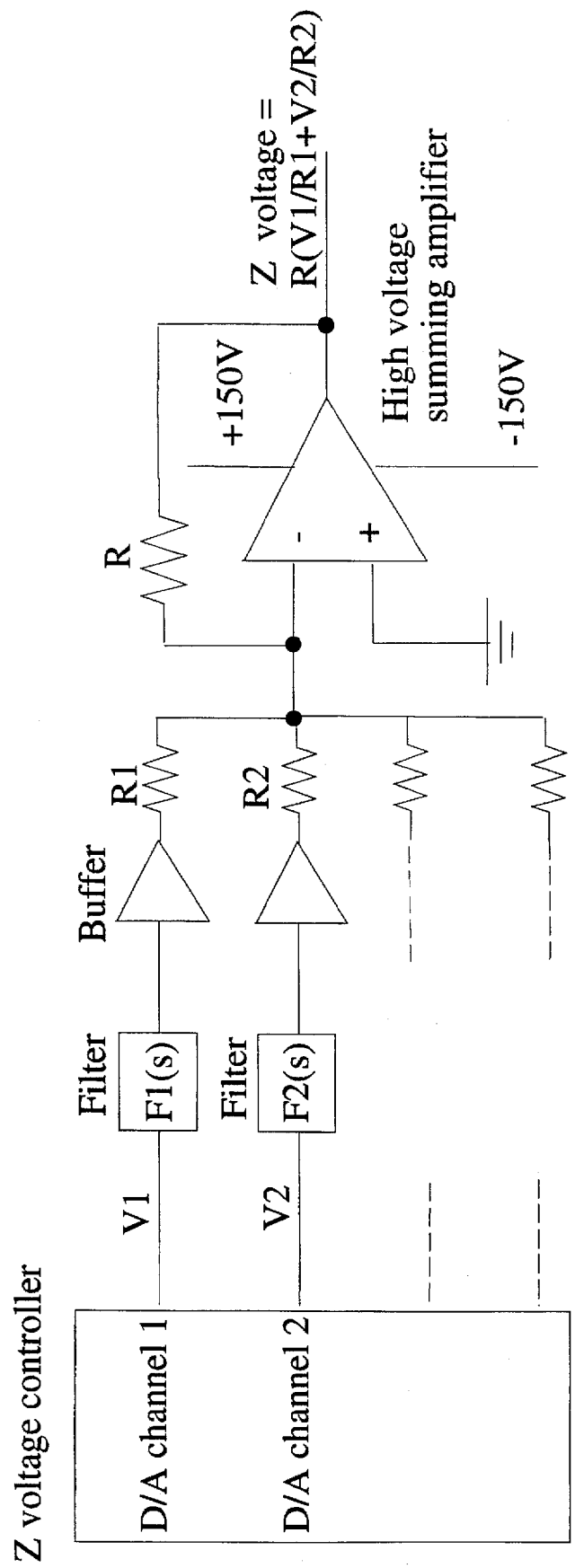
Figure 17:
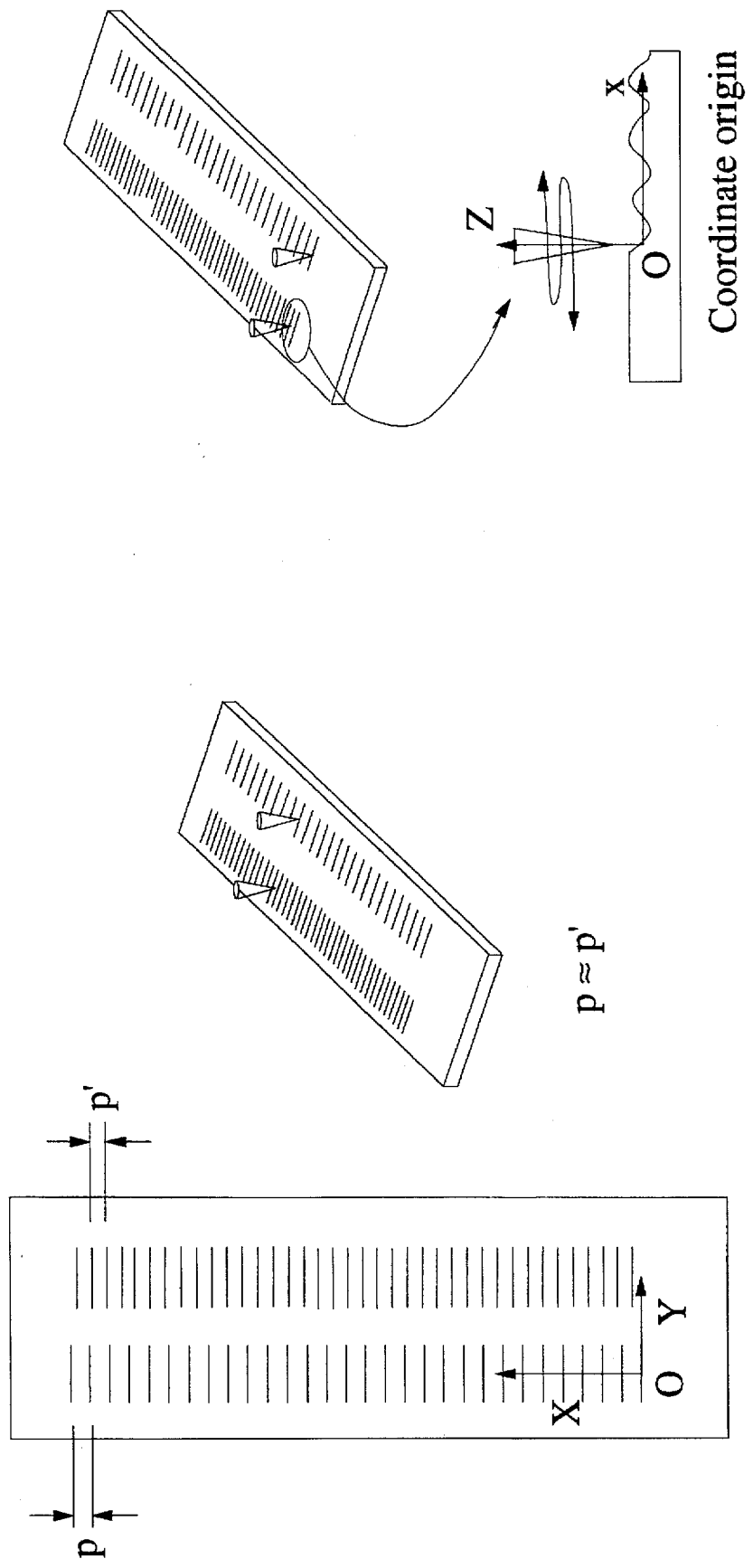
Figure 18:
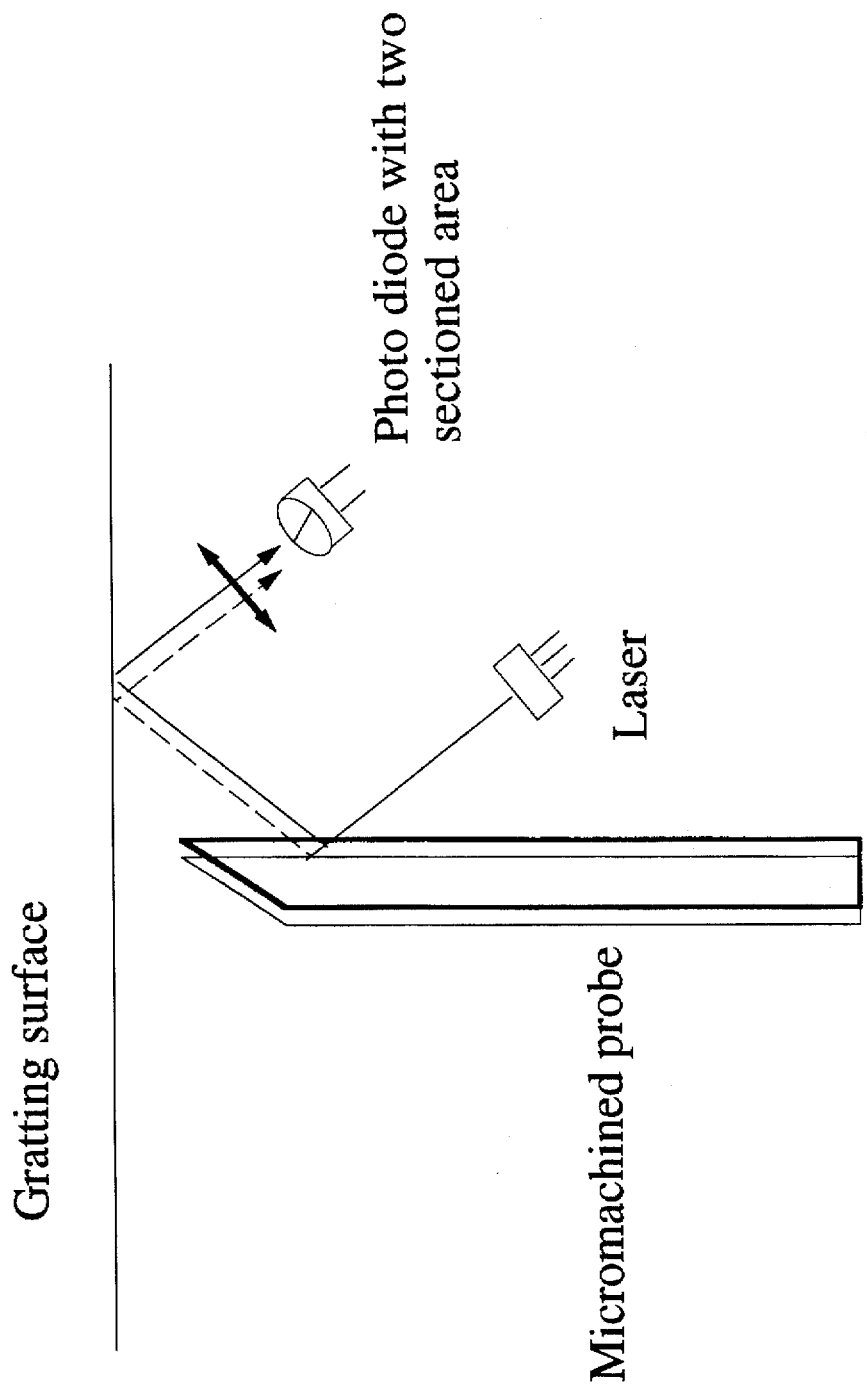
Figure 19:
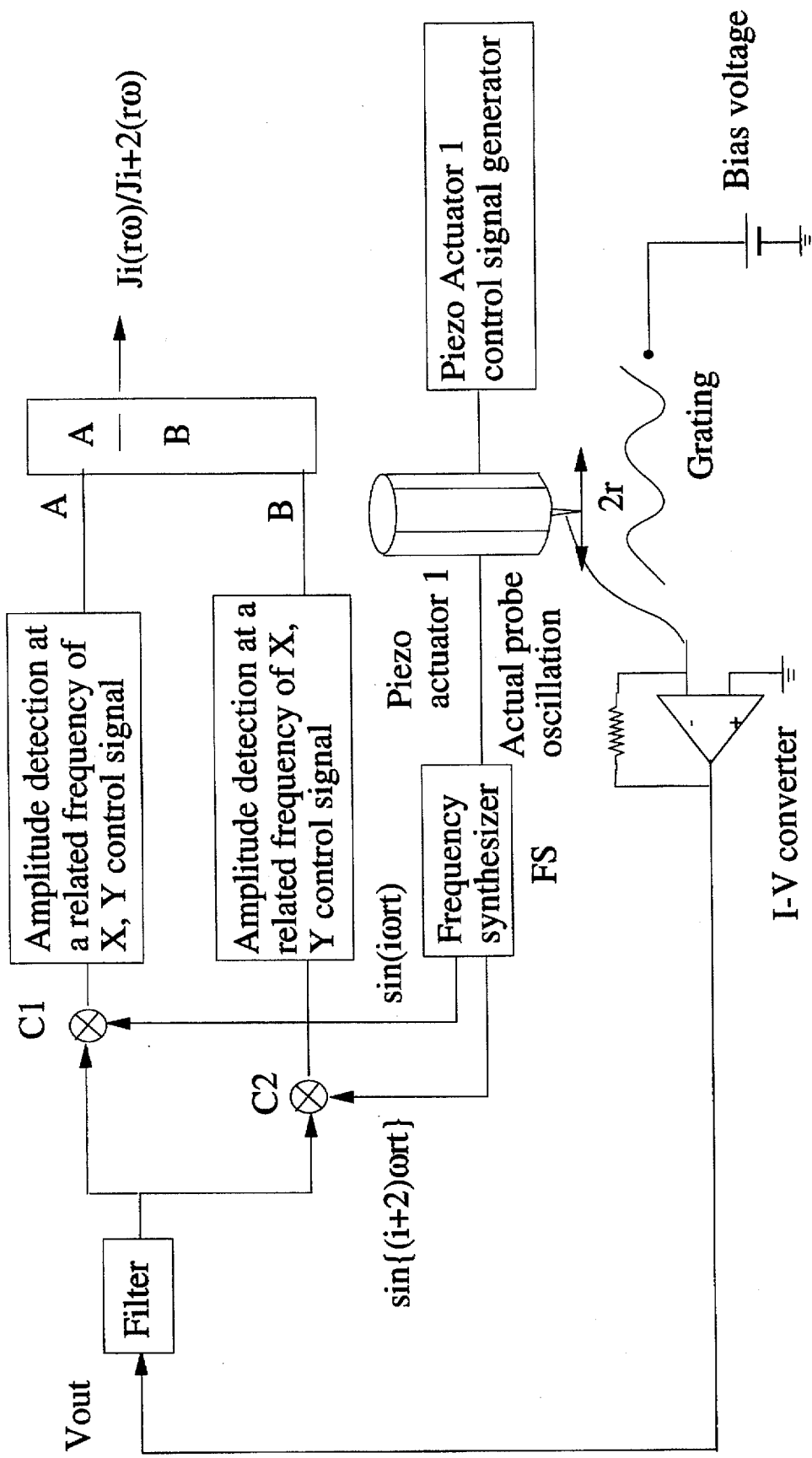
Figure 20A:
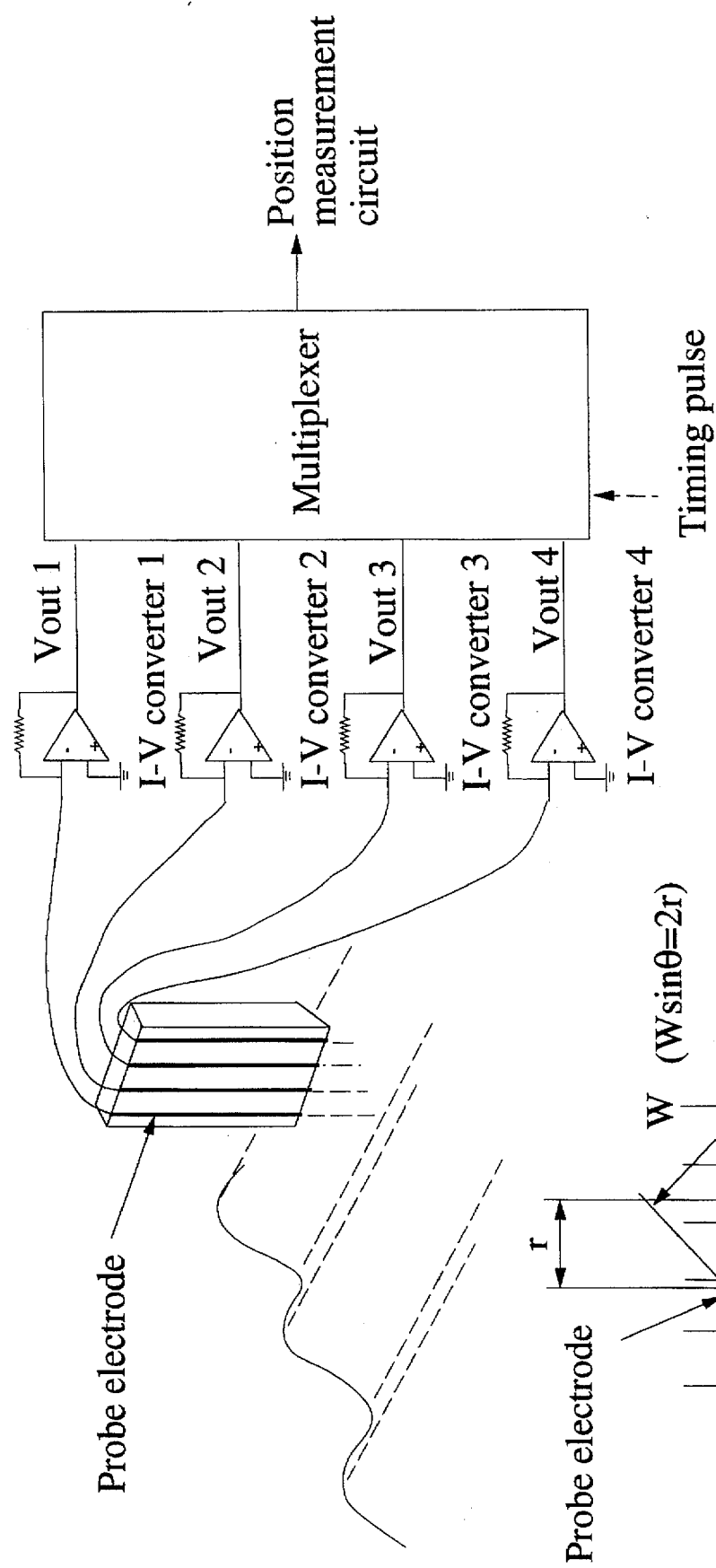
Figure 20B:
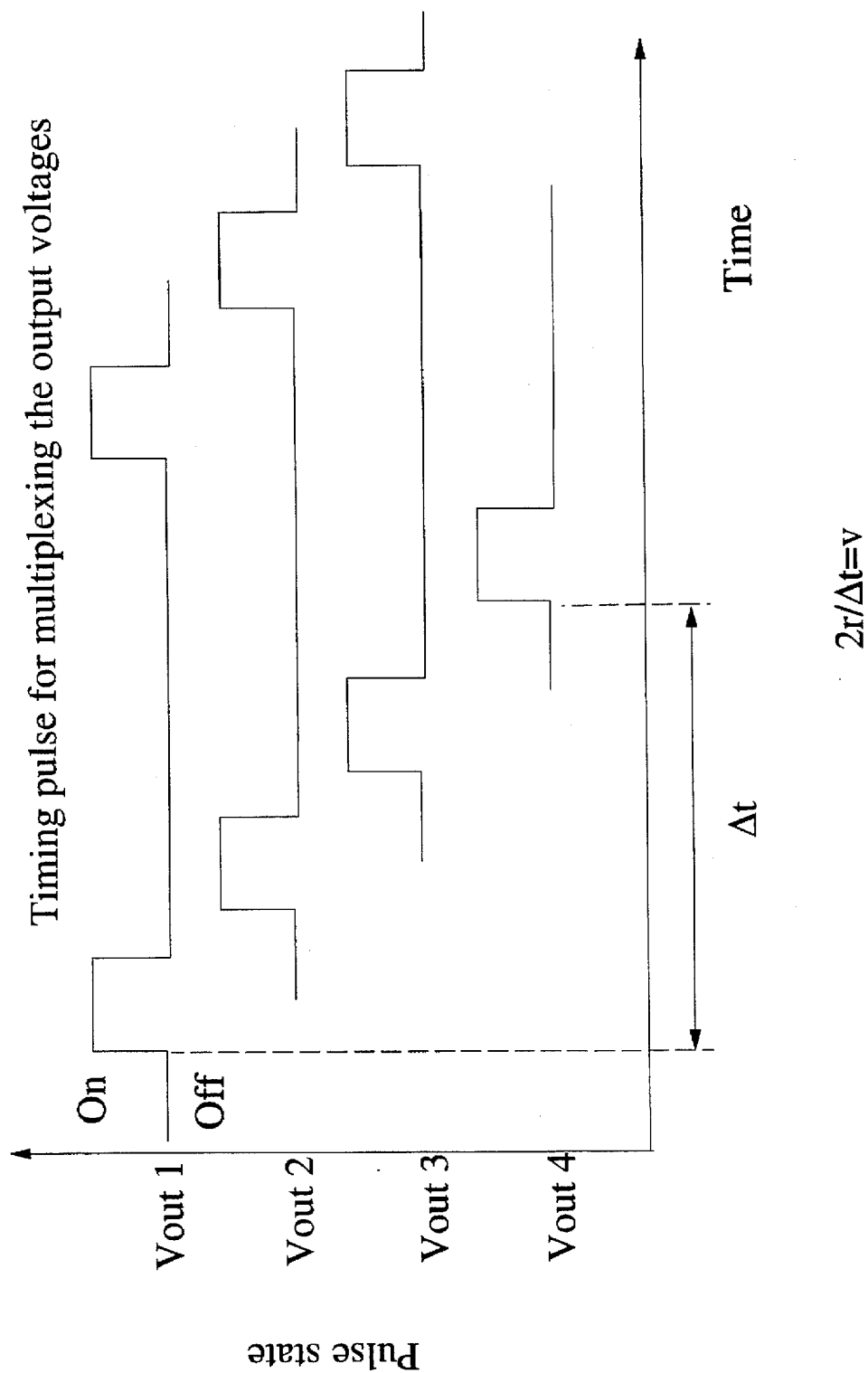
Figure 21:
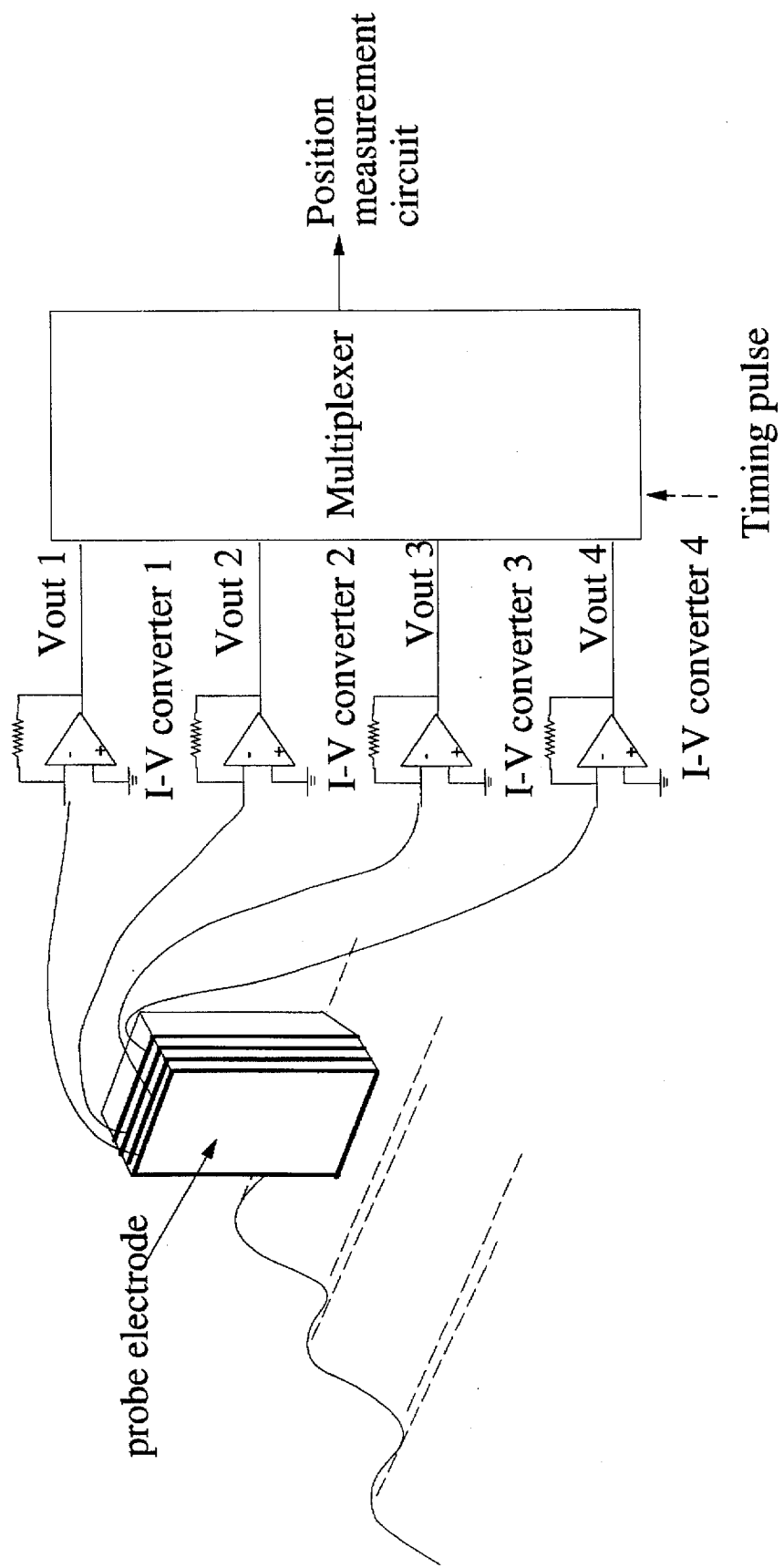
Figure 22:
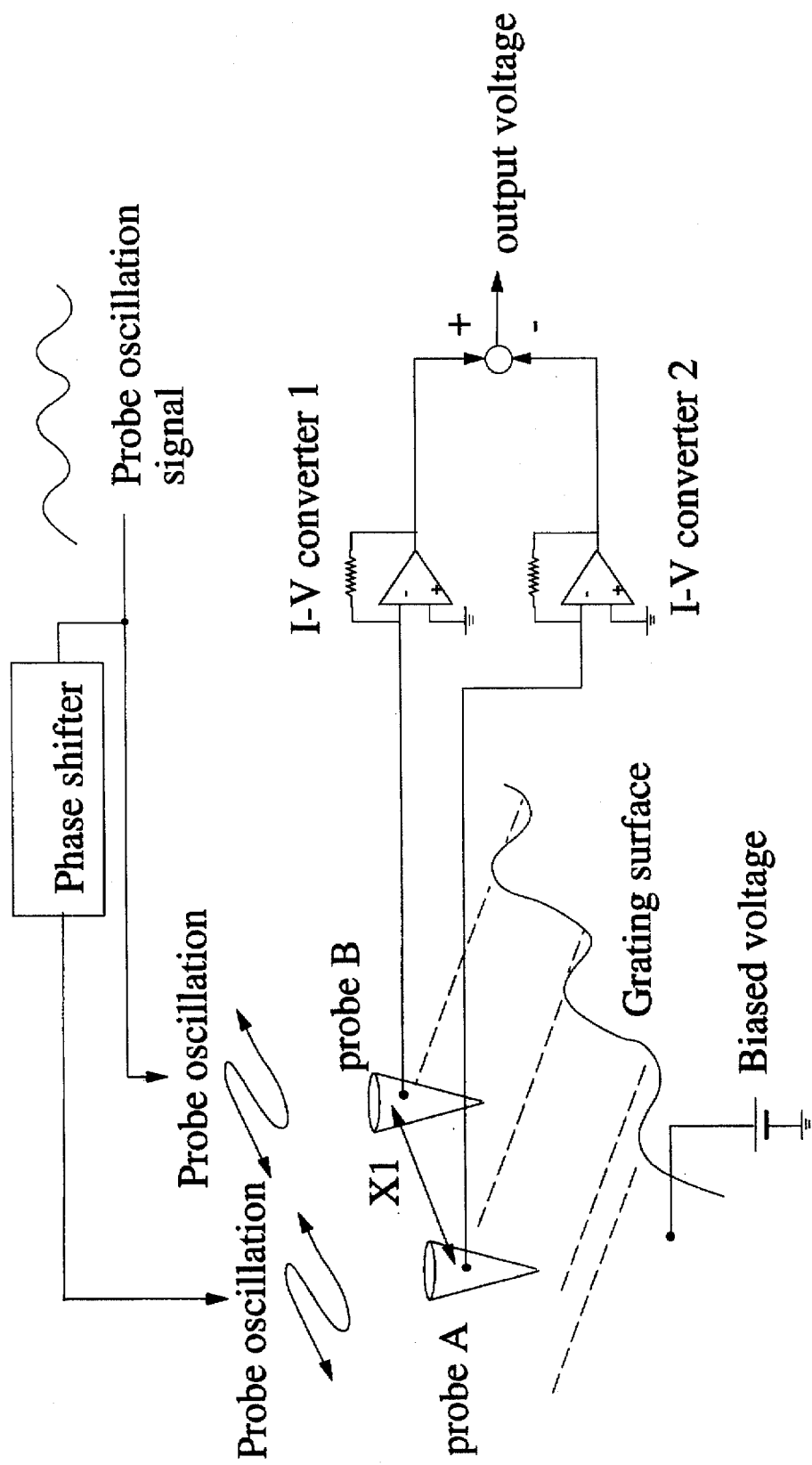
Figure 23:
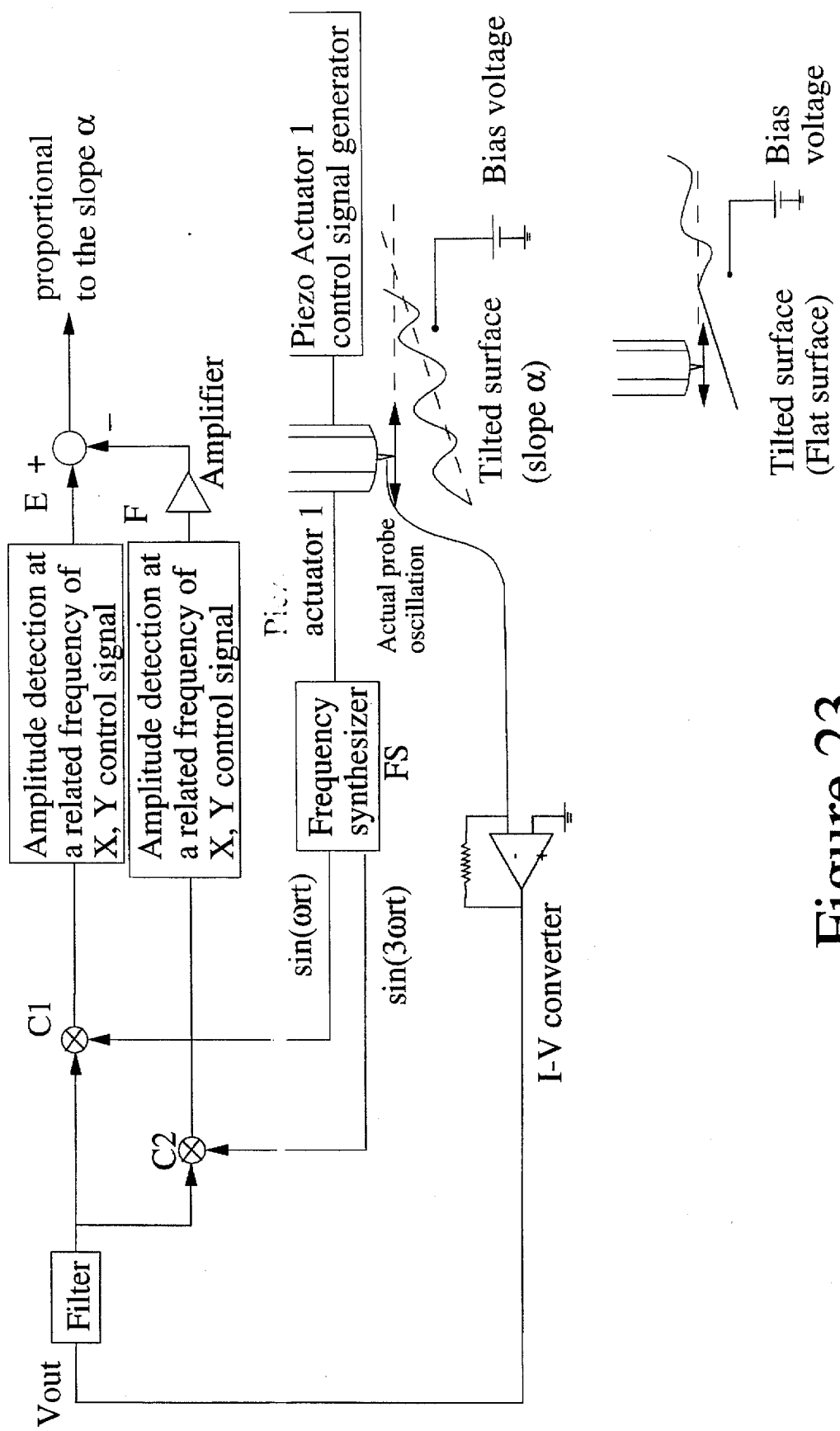
Figure 24:
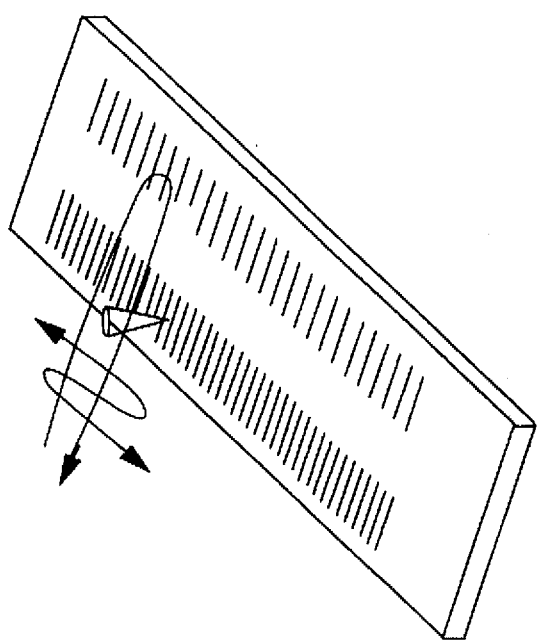
Figure 25:
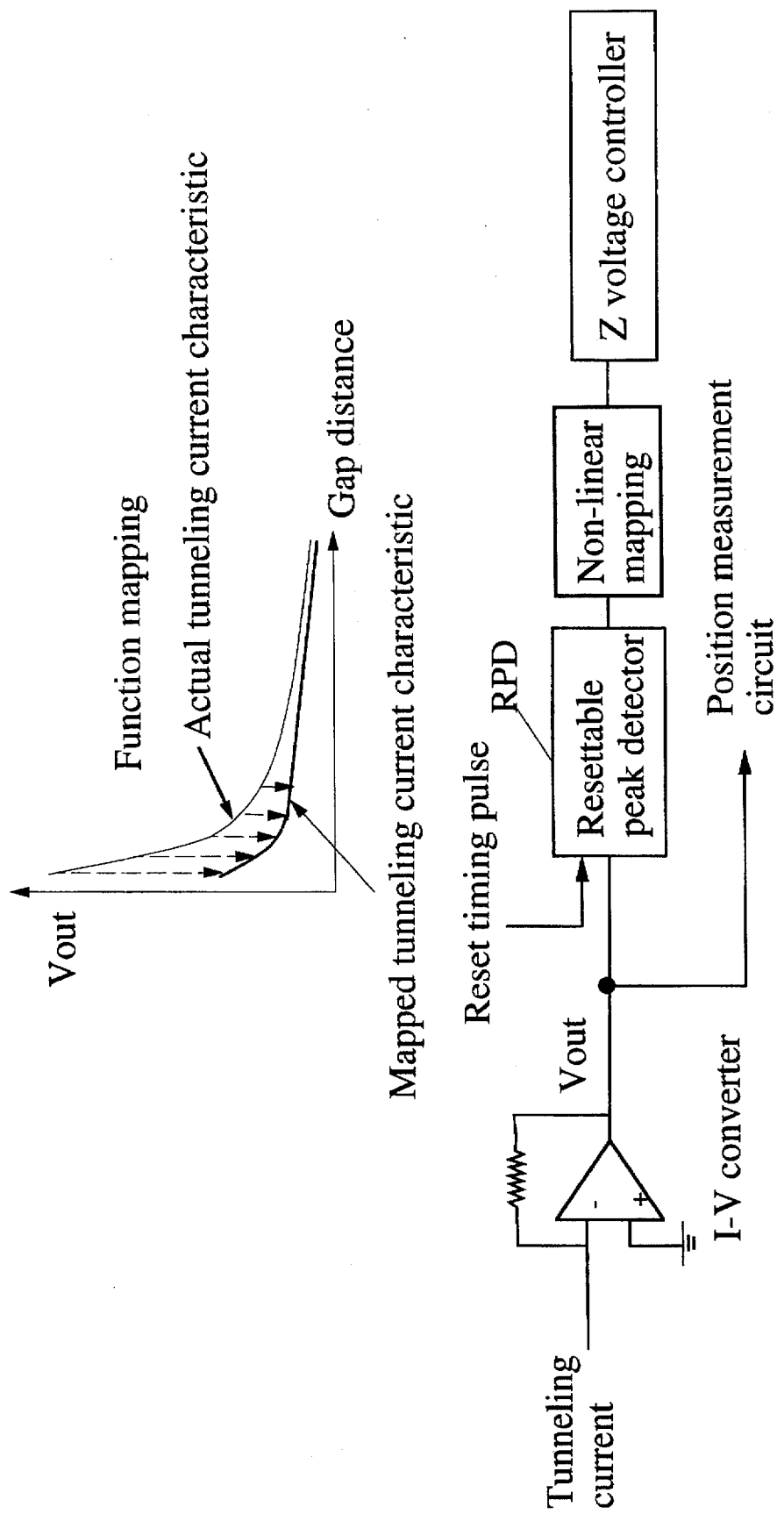
Figure 26:
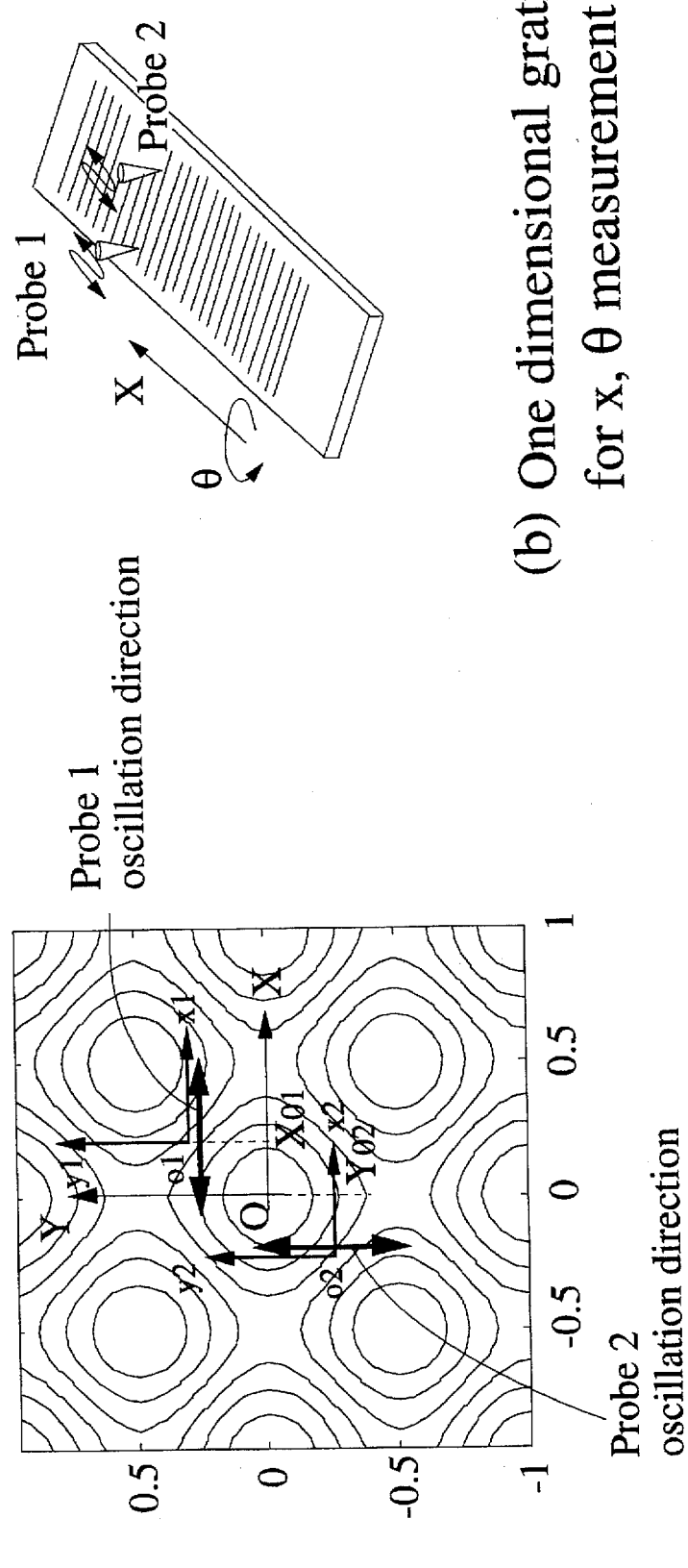

FIGS. 7(a) and 7(b) are the modifications for use of the invention with magnetic and electric undulating or alternating surface fields;

FIG. 8 is a similar view of capacitive sensing of a physically undulating grating;

FIG. 9 is an STM reproduction of a graphite sample used to test the invention;

FIGS. 10(a) and 10(b) are computer simulations using real atomic surface data of the probe scans and resulting tunneling current output;

FIG. 11(b) is an improved position measurement calculation flow system with an addition of a frequency synthesizer, and FIG. 11(a) details the phase-lock-loop thereof;

FIG. 12 illustrates an improved position detection flow with an addition of a frequency synthesizer in the reference tracking mode;

FIG. 13(a) is a novel reliable gap distance control that does not affect position measurement results;

FIG. 13(b) shows the experimental data obtained using the method described in FIG. 13(a);

FIG. 14(a) illustrates a new design of a micromachined probe useful for the invention;

FIG. 14(b) is an isometric view of newly designed micromachined probe;

FIG. 15 is a similar view and circuit diagram for probe oscillation with an integrated actuator and using the micromachined probe;

FIG. 16 shows a novel improved system for large displacement and precision actuator control;

FIGS. 17(a) and 17(b) show isometric views of scanning that provides absolute position/sensing;

FIG. 18 shows a highly accurate angle measurement technique for initial device set-up;

FIG. 19 is a similar diagram showing a method to measure the amplitude of probe oscillation without requiring an additional displacement sensor;

FIG. 20(a) is a similar diagram of a device/method for improving position measurement speed;

FIG. 20(b) is a waveform diagram that describes the timing of the multiplexing signals;

FIG. 21 is a diagram similar to 20(a) showing a device/method for high speed position measurement;

FIG. 22 is a block diagram showing the use of a novel two-probe configuration;

FIG. 23 is a block diagram illustrating a method to measure and compensate for the probe displacement/angle;

FIG. 24 illustrates improved absolute position sensing with a single probe and with increase in the signal to noise ratio by oscillating the probe in the Y direction;

FIG. 25 is a block diagram of a control method for gap distance control in a highly non-linear characteristic environment; and FIG. 26 shows other types of position measurement configurations.

DESCRIPTION OF PREFERRED EMBODIMENT(S)

Figure 1:
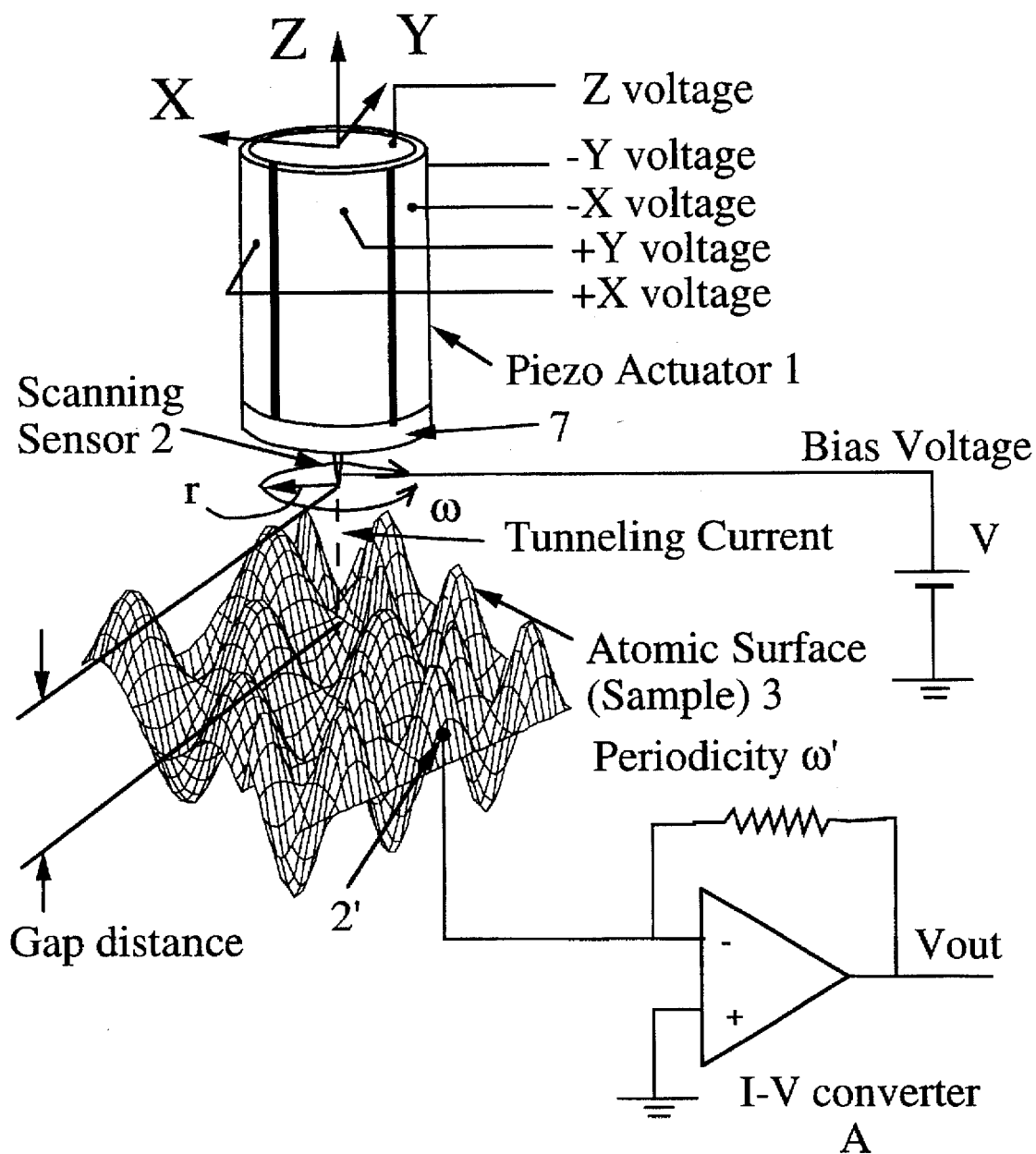
FIG. 1 is a combined isometric view of a scanning tunneling microscope sensor and detecting circuit and an atomic surface relatively moving past one another.

The preferred type of apparatus upon which the present invention improves in the above-described particulars, as shown and described in my prior said patent applications, is illustrated in FIG. 1 as used with a scanning tunneling microscope (STM). A scanning sensor probe 2, such as a pointed tungsten or Pt-Ir wire or the like, is illustratively shown operating with STM mode over a conducting undulating atomic surface sample 3, positioned, for example, on a table or surface T, FIG. 4. When the sensor tip is positioned several nanometers above the sample surface 3, a tunneling current is generated by the bias voltage V applied between the sensor tip and electrode 2' at the bottom of the surface sample.

The tunneling current is applied to an I-V converter A, resulting in an output voltage Vout, which is a function of the distance between the sensor probe 2 and the atoms of the surface 3. By scanning the probe 2 in the X,Y directions, over the sample surface, the topographic information of the surface is obtained and an image of the atomic surface is thereby reconstructed (FIG. 9).

Figure 3A:
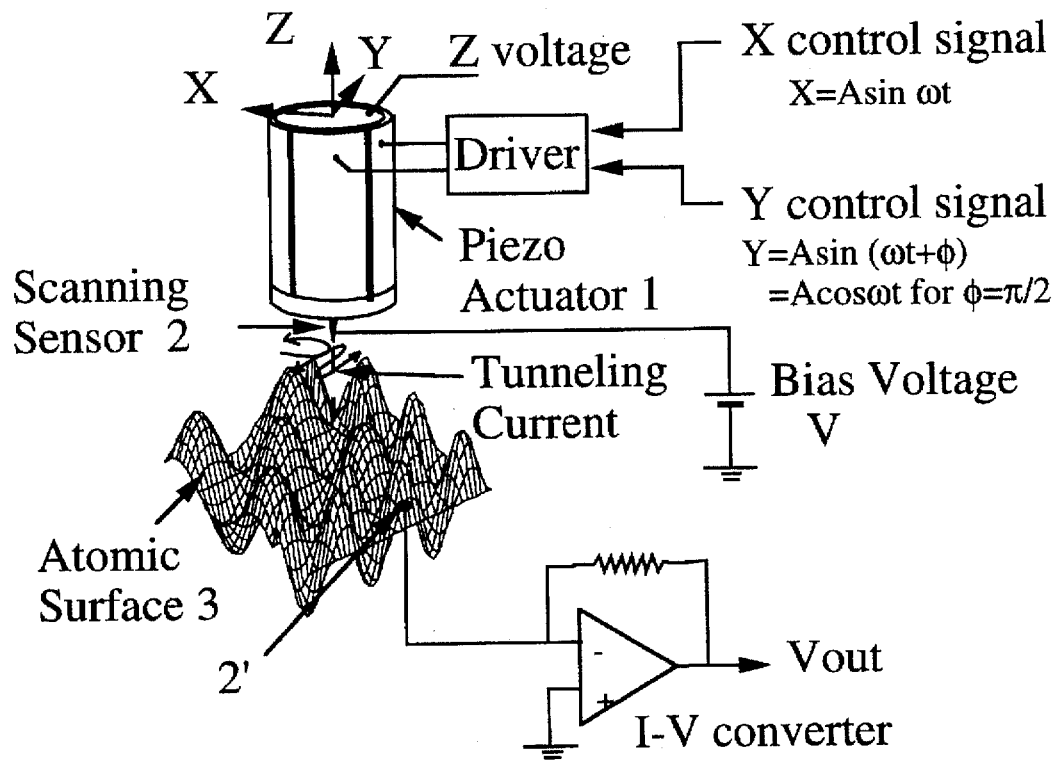
FIG. 3(a) is a combined isometric view which uses STM for schematic position measurement, with the graph illustrating the output from the I-V converter, X control signal, and Y control signal.
Figure 3A:
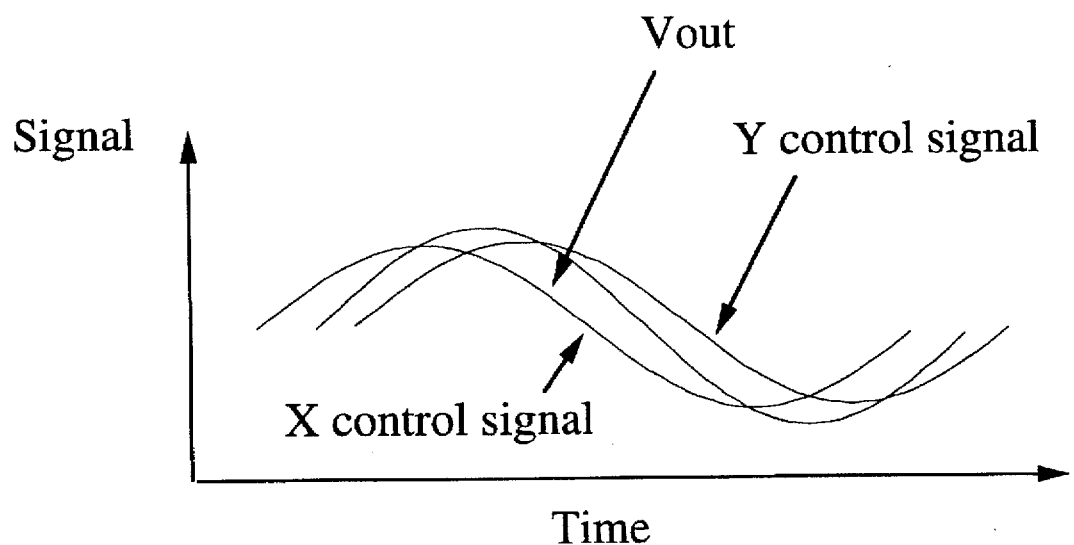

In accordance with the invention, the sensor probe 2 is oscillated substantially circularly or linearly, more particularly shown in FIG. 3(a), about a reference origin point, by an oscillating piezoelectric actuator cylinder 1 to which it is mechanically though insulatingly connected; in turn driven by X and Y applied control sinusoidal voltages. As shown, there is a pair of X-direction electrodes for the piezoelectric actuator (sine voltage $-A\sin \omega t$), a pair for the Y-direction (cosine voltage $-A\sin(\omega t + \phi)$, where $\phi$ is $\pi/2$), and a Z top electrode for height adjustment, to the desired several nanometer distance required for generating tunneling current.

The output voltage Vout is thus sinusoidal, also, but not in phase with, nor of the same amplitude as that of the piezoelectric actuator control signals, as indicated in the waveform graph of FIG. 3(a). By comparing the phase and amplitude of Vout with that of the controlling voltage driving the piezoelectric oscillator, the position of the probe—its reference point direction from, and distance off the apex of the nearest atom—can be obtained, and thus the position of the probe along the surface, encoded and indicated.

Figure 3B:
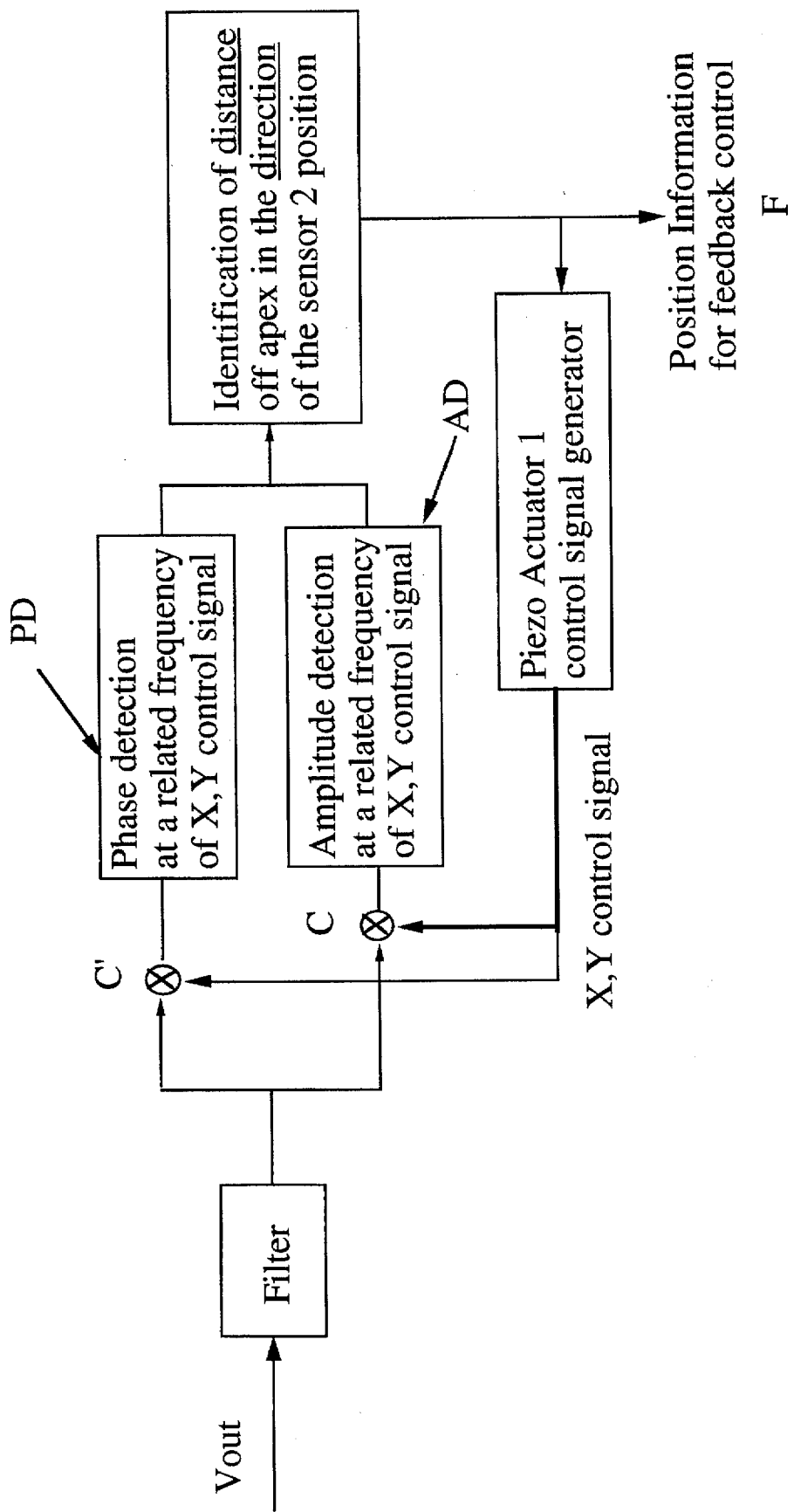
FIG. 3(b) shows the position measurement calculation flow.

In FIG. 3(b), comparisons of the amplitude and the phase of the control and output voltage sinusoidal signals of related frequency are effected at the multipliers C and C', respectively. After passing through the respective phase detection at PD and amplitude detection at AD (preferably though not essentially of an AM demodulation type, as described, for example, in *Modulation Theory*, Harold S. Black, D. Van Nostrand Co., 1953, page 141 on; and in *The Art of Electronics*, Paul Horowitz and Winfield Hill, Cambridge University Press, 1993, page 1031.), the probe positional information signals are generated, as mathematically demonstrated in my before-referenced IEEE International Conference on Robotics and Automation Proceedings paper, published May 22, 1995. These may be indicated, recorded, and/or used as by feedback F, FIG. 4, for control purposes, such as motor-controlling the table T carrying the sample 3.

Where the movement of the table is at a fast rate, Doppler or similar frequency variations may occur in Vout as compared to the frequency of the piezo driving voltages, but these can readily be compensated for by motion-sensing feedback, as is well known.

In order more fully to understand this operation and its underlying mathematical basis, and starting from a case of a linear scanning of the probe 2 in FIGS. 3(a) and 3(b), the $V_{out}$ function is mathematically given by the following equation relating this output voltage $V_{out}$ generated by the tunneling current (of amplitude A) in the gap between the probe 2 and the opposing point (at unknown position $X_0$) of the atomic or other periodic structure 3 (of periodicity frequency $\omega'$) and with probe oscillation over a radius $\tau$ at a frequency $\omega$, FIG. 3(a):

$$V_{out} = -V_0 + AJ_0(r\omega')\cos(\omega'X_0) - \qquad (1)$$

$$2A\sin(\omega'X_0) \sum_{m=1}^{\infty} J_{2m-1}(r\omega')\sin\{(2m-1)\omega t\} +$$

$$2A\cos(\omega'X_0) \sum_{m=1}^{\infty} J_{2m}(r\omega')\cos(2m\omega t),$$

where $V_0$ is the voltage produced by the tunneling current at an averaged probe-to-surface gap, m is an integer, and J is the Bessel function. (This corresponds to equation (5) in my before-cited IEEE article.) Equation (1) shows that the output signal $V_{out}$ contains many frequency components with a frequency higher than the oscillation frequency of the probe 2 and the amplitude of the nth order frequency component is proportional to $J_n(r\omega')$.

The goal of the position measurement, as before explained, is to obtain the value of $X_0$ out of the voltage signal $V_{out}$. Turning to FIG. 3(b) where the voltage $V_{out}$ of FIG. 3(a) is shown inputted at the left, and considering first one-dimensional position location ($X_0$), the multiplier at C, FIG. 3(b), multiplies this voltage $V_{out}$ of Equation (1) by the probe control signal $\sin(\omega t)$ which, when detected at frequency $\omega$, and passed through a low pass filter, automatically results in the signals represented by the following equation, which gives the value of the position $X_0$ of the probe on the atomic or other surface from the nearest crest or apex:

$$-A\sin(\omega'X_0)J_1(r\omega') \qquad (2)$$

Similarly, $$-A\cos(\omega' X_0) J_2(r\omega') \quad (3)$$

is obtained by multiplying Equation (1) by $\cos(2\omega t)$. (Equations (2) and (3) correspond to Equation (6) in my said IEEE article.) With the two results, complete position measurement ($X_0$) is achieved.

Figure 6:
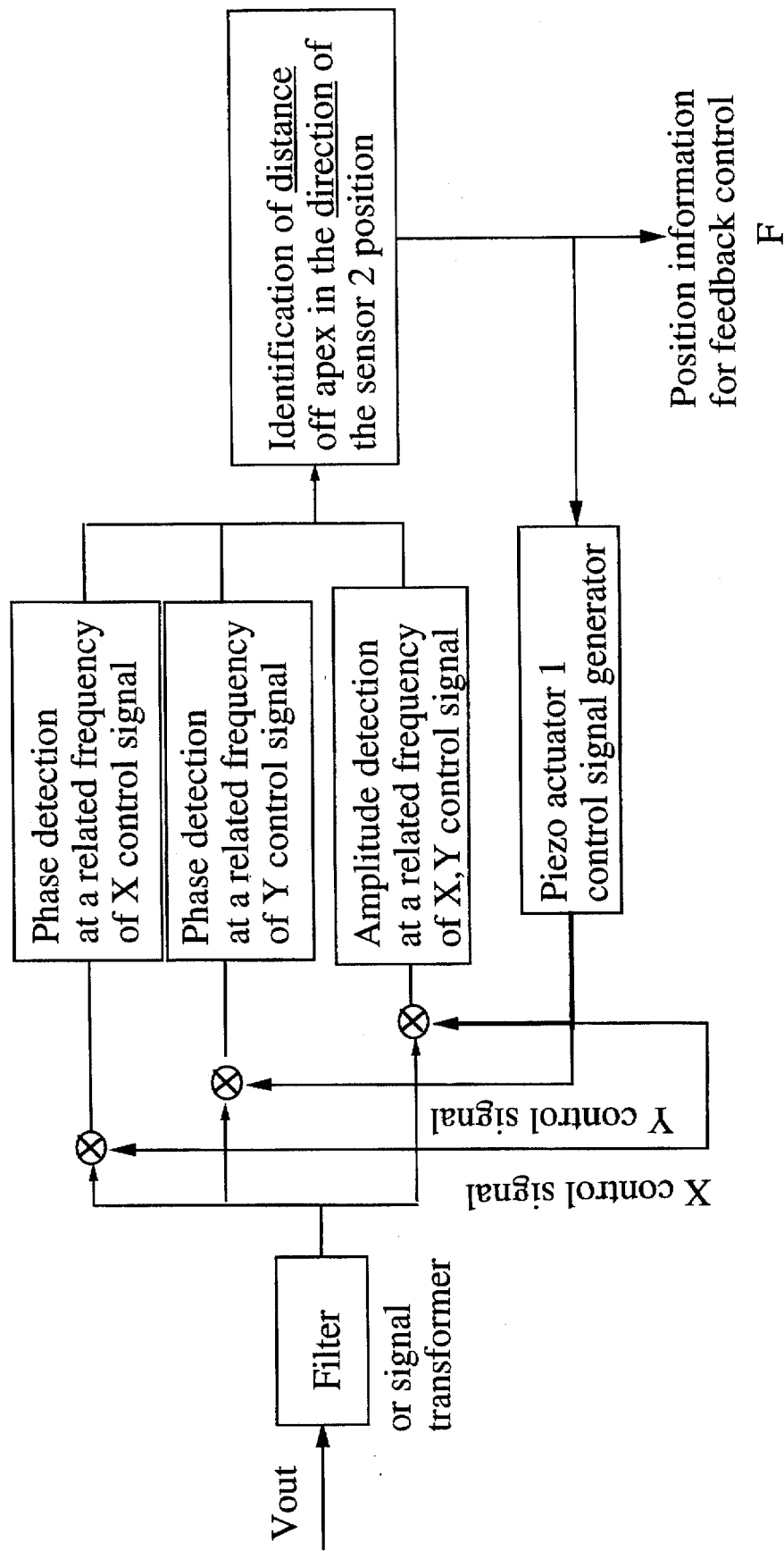
FIG. 6 is an example of two-dimensional position measurement calculation flow.

Considering two-dimensional position detection, similar comments apply to the Y direction, the thick lines in the output of the probe actuation control signal generator of the multiplier C in FIG. 3(b) and in FIG. 6 conventionally representing both X and Y.

In the case of circular probe scanning, the output signal $V_{out}$ can be shown after precise analysis as $$V_{out} = \ldots -2A\sin(\omega' X_{01}) J_1(r\omega') \sin(\omega t) - \quad (4)$$
$$2SA\sin(\omega' Y_{01}) J_1(r\omega') \cos(\omega t) +$$
$$2A\{\cos(\omega' X_{01}) - \cos(\omega' X_{01})\} J_2(r\omega') \cos(2\omega t)$$
$$\ldots$$

which shows that the output signal is also sinusoidal and the amplitude of each component (such as $\sin(\omega t)$ or $\cos(\omega t)$ in equation (4)) will represent the position information $X_{01}$, $Y_{01}$ as demonstrated in the experimental result of FIG. 10(b).

Figure 5:
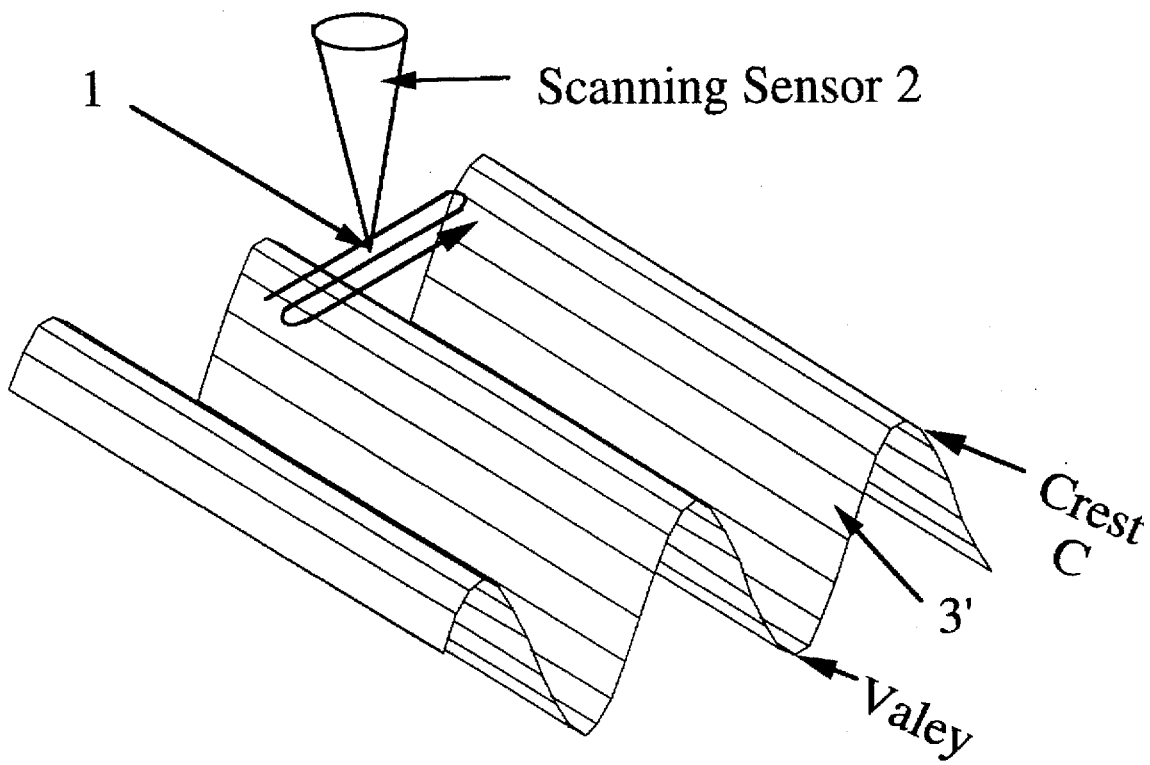
FIG. 5 is a schematic view of the invention with holographic grating and linear scanning sensor movement to obtain one-dimensional position information.

If phase detection is used in the case of FIG. 5, rather than amplitude detection, the multiplier(s) C' (FIG. 3(b)) multiplies the output voltage $V_{out}$ from the I-V converter by $\cos(0.5\omega t)$ giving:

$$V_{out}\cos(0.5\omega t) = -V_0\cos(0.5\omega t) + A\sum_{i=0}^{\infty} B(i)\cos\{(i+0.5)\omega t + \theta(X_0)\}, \quad (5)$$

where $$B(i) = \sqrt{J_p(i)^2(r\omega')\cos^2(\omega' X_0) + J_{q(i)}^2(r\omega')\sin^2(\omega' X_0)} \quad (6)$$

$$\theta(X_0) = \tan^{-1}\left[\frac{J_q(r\omega')\sin(\omega' X_0)}{J_p(r\omega')\cos(\omega' X_0)}\right]$$

$$p = [0,2,2,4,4, \ldots], q = [1,1,3,3,5, \ldots]$$

and p and q are vectors corresponding to i. Now if the oscillation amplitude r is chosen such that $J_{p(i)}(r\omega') = J_{q(i)}(r\omega')$ for a particular i, then $$B(i) = J_{p(i)}(r\omega'), \theta(X_0) = \omega' X_0 \quad (7)$$

Thus, it automatically produces a signal F represented by $\omega' X_0$ after phase detection at PD in FIG. 3(b).

FIG. 9 is an STM-topographical image of the atoms of a highly-oriented pyrolitic graphite (HOPG) surface of Union Carbide Grade B graphite, 1.2×1.2 nanometers in size, that I produced using a Pt-Ir wire probe tip 2 adjusted in the range 1-2 nanometers above the atomic surface 3, scanning over the sample in about 1 second. I applied 200 Hz sinusoidal control voltages to a one-half inch long by one-quarter inch diameter piezoelectric cylinder, manufactured by Matlock Company, to which the probe 2 was epoxy-secured, with an insulating ceramic disc 7 interposed to insulate the probe from the X and Y piezoelectric sinusoidal control signals of FIG. 1. In the computer readout of FIG. 10(a), the graphite atoms are shown in contour, as the small circles, surrounded by concentric circles or near-circles that represent the rotary oscillation of the probe tip 2 under the control of the control signals X and Y. The resulting corresponding (though different phase and amplitude) tunneling current produced for one scan (after high-pass filtering) is shown in FIG. 10(b), generated by the probe oscillation.

Figure 2:
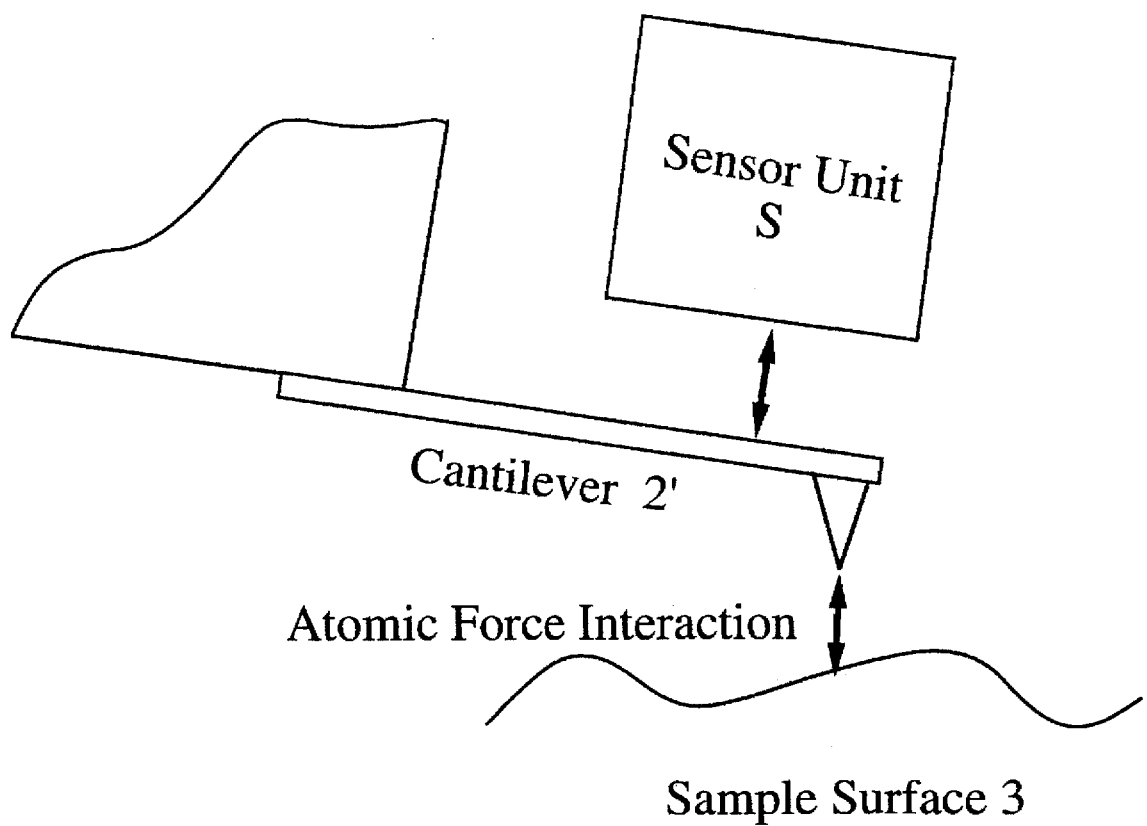
FIG. 2 is a simple schematic view of an atomic force microscope sensor for the invention.

As before stated, the probe 2 may also be replaced by a cantilever atomic force interaction field type sensor S, FIG. 2, of an AFM, as, for example, of the type described in the previously cited patent.

It has also been earlier pointed out that other physically undulating surfaces than an atomic surface may also be scanned, using the nanometer sensor position location technique of the invention, such as the conductive-coated holographic grating 3' of FIG. 5—shown for one-dimensional scanning. Clearly the technique may also be used with other undulating gratings or rulings or surfaces and the like, as well.

The sensor probe may also be capacitive as in FIG. 8, shown using pointed electrode cooperating capacitively with the surface electrode 2' and linearly oscillated in this case over a grating 3 coated with conductive material.

The invention, of course, is not limited in the embodiments of FIGS. 1–5 to one dimensional position location. FIG. 6 shows the derivation of two-dimensional position signals in the manner of FIG. 3, but for both X and Y components of the control and output voltage.

As earlier stated, moreover, the undulations or periodic alternating crests or peaks and valleys of a surface-to-be-scanned need not only be physical undulations, but the surface may contain periodic magnetic or electric undulations or crests and valleys as well. In FIG. 7(a), periodic magnetic undulations are shown generating an undulating magnetic field by successive north (N) and south (S) opposite polarity surface regions, with a magnetic sensor being linearly oscillated and a sinusoidal output voltage being produced by magnetic interaction with the magnetic undulations provided on the surface. The analogous electrical undulations are shown provided in FIG. 7(b) by oppositely-charged ferroelectric or other successive regions on the surface, and using, as an example, cantilever-type electrical-force sensing.

Turning, now, to the improvements offered by the method and apparatus of the present invention, reference is first made to FIG. 11(b) which is a diagram similar to a combination of FIGS. 3(a) and 3(b), which illustrates a position detection method of the present invention improving the response speed and precision. For simplicity, only the case of the phase detection method is described; but it is equally applicable for the amplitude detection method. The actual displacement of the piezo actuator 1 is first monitored by a displacement sensor. This signal is then fed into a frequency synthesizer, which outputs signals ($\cos(0.5\omega t)$ and $2.5\omega t$, or $\sin(\omega t)$ and $\cos(2\omega t)$ for amplitude detection method), which is synchronized with the probe oscillation. Again, the multiplication in the multiplier C' will produce the position signal after phase detection PD, which also uses the phase output ($2.5\omega t$) from the frequency synthesizer as a reference.

A basic schematic diagram of such a frequency synthesizer FS is shown in FIG. 11(a), based on the Phase-Locked Loop (PLL) method. PLL (dotted enclosed area) contains a loop filter, integrator and an oscillator the output phase of which is controlled to match the input phase by detecting the phase difference between the input and the output signal at the multiplier C'. Frequency synthesis can be easily achieved by feeding the output signal from the PLL into the sine function generator as shown in the FIG. 11(a).

This new method provides stable and high precision results in position measurement even if the probe oscillation frequency is near its resonant frequency, since the phase shift of the probe oscillation due to the change of environmental condition will be corrected by the present method.

Figure 4:
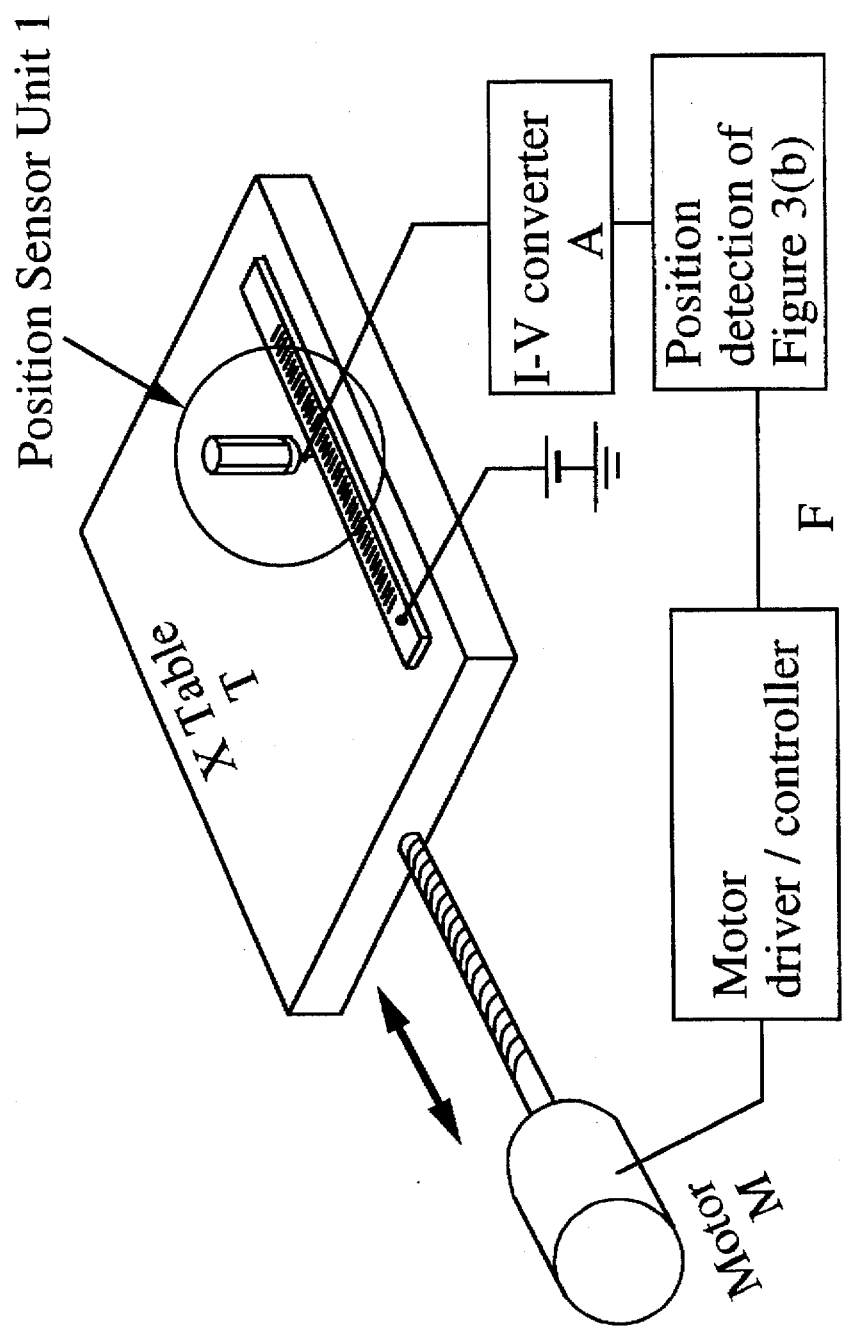
FIG. 4 is an application using the invention as a position sensor for X table control.

FIG. 12 is similar to FIG. 11(b), but shows the case when positional signals are fed back to control the relative movement of the probe and surface before described, as earlier discussed in connection with the embodiment of before-described FIG. 4, now particularly to track the motion of the grating crest/valley. In this case, the sensor probe position can be described as:

$$x = r\sin(\omega t) + x_A, \quad (8)$$

where $x_A$ is the center position of the sensor probe oscillation. If $$X_0 + x_A = \frac{n\pi}{\omega'}$$

$$n = 0, \pm 1, \pm 2 \ldots \quad (9)$$

the signal $$\tan^{-1}\left[\frac{J_{q(i)}(r\omega')\sin(\omega'X_0 + \omega'x_A)}{J_{p(i)}(r\omega')\cos(\omega'X_0 + \omega'x_A)}\right] \quad (10)$$

after phase detector PD always becomes $n\pi$ regardless of the oscillation amplitude variation. Thus, if the center position of the sensor probe oscillation is controlled so that the output signal from phase detector in FIG. 3(b) becomes $n\pi$, the position will be obtained as $X_0 = -x_A + n\pi/\omega'$ assuming that $x_A$ is known. This is a situation in which the center position of the sensor probe oscillation is "locked" above a crest or a valley of the grating scale. Similarly if $$X_0 + x_A = \frac{\pi}{2\omega'} + \frac{n\pi}{\omega'} \quad n = 0, \pm 1, \pm 2 \ldots \quad (10b)$$

the signal after phase detector PD always becomes $$\frac{\pi}{2} + n\pi$$

regardless of the oscillation amplitude variation. Again, this is a situation in which the center position of the sensor probe oscillation $X_0 + x_A$ is "locked" above a zero cross point of the grating scale. In such "locked" condition, the position $X_0$ can be calculated from Equation 10(b) with a value of $x_A$.

This position detection improvement gives higher precision due to the insensitivity to any probe oscillation amplitude variation or error.

While a single probe has been described, additional probes may also be used. In FIG. 22, for example, two probes Probe A and Probe B, are shown positioned along a linear grating surface with a distance $$X_1 = \frac{1}{\omega'}(2n\pi + \theta'),$$

where n is arbitrary integers. Each probe is oscillated at the same frequency $\omega$ but with a different phase as:

$$x_A(t) = r\sin(\omega t)$$

$$x_B(t) = r\sin(\omega t + \theta) \quad (11)$$

respectively. Thus, the output voltage after subtracting the output from the I-V converter 1 by the output from the I-V converter 2 becomes $$V_{out} = \ldots \quad (12)$$

$$-2A\sin(\omega'X_0)\sum_{m=1}^{\infty} J_{2m-1}(r\omega')\sin\{(2m-1)\omega t\} +$$

$$2A\cos(\omega'X_0)\sum_{m=1}^{\infty}(-1)^{m+1}J_{2m-1}(r\omega')\cos\{(2m-1)\omega t\}$$

$$\ldots$$

when $\theta = \frac{\pi}{2}$ and $X_1 = \frac{\pi}{2\omega'}$.

As it is clear, Equation (12) becomes $$V_{out} = \ldots \quad (13)$$

$$-2AJ_{2m-1}(r\omega')\sum_{m=1}^{\infty}\cos\{(2m-1)\omega t + (-1)^{m+1}\omega'X_0\}$$

$$\ldots$$

Again, the position information $X_0$ will be obtained after the phase detector (PD in FIGS. 3(b), 11(b) and 12). By changing the value of $\theta$ and $\theta'$, several variations become possible for this method.

One advantage of this configuration, in spite of its increased complexity, is that the required bandwidth of the I-V converter can be reduced since only the first order frequency is necessary for the position measurement. In the case of the single probe configuration, the I-V converter must have two times higher bandwidth as indicated in Equations (2) and (3). The effect of common noise appearing in each probe will also be canceled out in this approach.

FIG. 26 shows other types of position measurement configurations applied to the two-dimensional gratings for X,Y orthogonal position measurements. A first case shows that the two sensor probes are located diagonally relative to one another in terms of the motion direction above the reference scale. The grid pattern shown can be expressed as:

$$Z = A_1\cos[\omega'(x_j + X_{0j})] + A_1\cos[\omega'(y_j + Y_{0j})], j = 1, 2 \quad (14)$$

Now, if we focus only on probe 1, we get $$V_{out1}\cos(0.5\omega t) = \{A\cos(\omega'Y_{01}) - V_{01}\}\cos(0.5\omega t) + \quad (15)$$

$$A\sum_{i=0}^{\infty} B(i)\cos\{(i + 0.5)\omega t + \theta(X_{01})\}$$

after multiplying the output voltage $V_{out1}$ by $\cos(0.5\omega t)$, where:

$$B(i) = \sqrt{J_{p(i)}^2(r\omega')\cos^2(\omega'X_{01}) + J_{p(i)}^2(r\omega')\sin^2(\omega'X_{01})} \quad (16)$$

$$\theta(X_0) = \tan^{-1}\left[\frac{J_q(r\omega')\sin(\omega'X_{01})}{J_p(r\omega')\cos(\omega'X_{01})}\right]$$

$$p = [0,2,2,4,4,\ldots], q = [1,1,3,3,5,\ldots].$$

and p and q are vectors corresponding to i. Again, if the oscillation amplitude r is chosen such that $J_{p(i)}(r\omega') = J_{q(i)}(r\omega')$ for a particular i, then $$B(i) = J_{p(i)}(r\omega'), \theta(X_{01}) = \omega'X_{01} \quad (17)$$

Thus, the position information in the x direction $X_{01}$ is obtained through the phase detector (PD in FIG. 3(b) for example). Similarly, the position information in the Y direction $Y_{o2}$ is obtained through the probe 2.

One-dimensional gratings for X, θ position measurement with multiple probes is also shown. In this second case, each probe is oscillated in the predetermined direction and the position is measured in the same direction, thus performing the expected position measurement by comparing the two measurement results, with the assumption that the rotational center is known.

Turning now to the before-described gap-control problems, FIG. 13(a) shows apparatus for obtaining an improved gap control, which effectively decouples the positional information contained in the output voltage $V_{out}$. It contains a resettable peak detection circuit RPD, which can be also realized by digital computation. This circuit holds the maximum output voltage over a time, which is a little longer than one cycle of the probe oscillation. The peak value held in the circuit, is first fed back to the Z axis voltage of the piezotube actuator so that the probe can keep the minimum gap distance off the grating surface maintaining such peak value at predetermined level. The peak value is then reset for the next peak detection. Meantime, the output voltage $V_{out}$ is fed to the position detection circuit. Since the gap control frequency response will be much slower than the probe oscillation frequency, this scheme will not affect the following position measurement procedure.

FIG. 13(b) shows experimental data obtained with the method described in FIG. 13(a). The micromachined probe described in FIG. 14(a) was used. The upper graph shows the $V_{out}$ before the grating moves. The probe is oscillated at around 3 KHz. The x axis shows the time (200 μsec/div) and the y axis indicates the $V_{out}$. The lower graph shows the result after the grating position was moved slightly. The difference of the signal pattern can be observed. It is thus clear that the new control method of the present invention maintains an appropriate gap distance without losing positional information.

FIG. 25 shows the method of gap control using a non-linear function mapping. The tunneling current vs. gap distance curve is mapped close to linear at a low voltage output region. However, it is mapped so that the corresponding function still rises steeply when the gap distance becomes very small. This mapping function is first applied to the signal from the peak detector. The output signal from such mapping is then used as the feedback signal of the gap distance control through the Z voltage controller. This method gives highly stable control and yet guarantees that the probe will not crash onto the grating surface.

Further on the subject of improving gap control, FIG. 16 is a diagram illustrating a method to obtain a large motion range in solid state actuator, such as piezoelectric or electrostrictive actuators, for the purpose of the gap distance control while keeping high resolution, using a digital control system. This can be realized by using two Digital to Analog (D/A) converters. After computing the necessary control voltage in the Z direction, this control signal is sent through the two D/As. The output voltages V1 and V2 through filters F1 and F2 are summed after being amplified by R/R1(=1) and R/R2(=10), respectively, through the high voltage summing amplifier. If the D/A has 16 bit resolution and +/−10 V output range, this configuration enables the Z-axis voltage at the output of the high voltage amplifier swing +/−110 V continuously. In spite of such high voltage range, the output resolution is still determined by the resolution of the D/A, which is about 0.3 mV.

Usually, when the signal is amplified, noise is also amplified. To minimize this effect, the filter F2(s) forms a low pass filter. F1(s) is then chosen to have a transfer function so that the transient response at the high voltage amplifier can be optimized.

The before-described limitations on prior probe construction and obviation are addressed in FIG. 14(a) which illustrates a fabrication process of a probe made from <100>-oriented silicon crystal wafer (step (1) in FIG. 14(a)). This method uses the fact that <111> surfaces etch rate becomes much slower than all other crystallographic planes using anisotropic etchant such as Potassium Hydroxide (KOH)—(step(3)). After the mask pattern is formed (step(2)) by the protective layer, anisotropic etch is conducted mainly leaving <111> crystallographic planes, which have an inclination of 54.7 degrees. This method also uses the fact that the geometry of the opening such as convex corners of the mask pattern will be undercut with such etching (step (3)). As a result, a spear-head like probe is formed. Finally, very thin (<50 nm) metal film is evaporated (step (4)) to form the electrode, and it may be diced (step (5)) and attached to a base unit. This probe has the lowest natural frequency in the thickness direction, which makes it ideal for attaining the improvements of the present invention. Compared with the conventional Atomic Force Microscope (AFM) probe, it is easy to mount to the base without any restriction of the wire connecting space.

FIG. 14(b) graphically shows another advantage of this new probe design. The probe tip shape is preferably further fabricated in the shape of a symmetrically thinned screw driver head with a slight curvature as a result of anisotropic etching and undercut effect. Due to its symmetric design, the probe has larger tolerance in the initial setting error θ to the grating surface. Secondly, this probe design provides a larger effective probing area compared with the traditional point probe resulting in locally averaged signal output. This contributes to the increase of signal to noise ratio in the final position measurement result. A similar effect can be obtained by oscillating the probe in the Y direction much faster than in the X direction, which is also indicated in the figure.

FIG. 15 shows an example of a monolithic probe sensor/actuator based on the design shown in FIGS. 14(a) and 14(b). The oscillation actuator can be fabricated using piezofilm deposition or magnetostrictive film deposition, forming a pair of electrodes for capacitive operation or other type of solid state actuator. In the case shown in FIG. 15, the probe device with piezofilm becomes a part of Pierce type oscillator circuit (but not, of course restricted to this circuit). The oscillation information is fed back positively to the actuator driver, providing stable oscillation.

The subject of improved position sensing with an absolute position measurement was earlier referenced. FIGS. 17(a) and 17(b) show methods to provide such absolute position information using the present invention. In FIG. 17(a), two holographic gratings formed on the same base plate adjacent each other are employed. These two holographic gratings have slightly different periods of p and p'. When the two probes oscillate above the gratings, the measured positions indicate the same value. The ratio between the distance off the nearest crest and each grating period, however, shows different values due to the slight difference of the grating period. In fact, the difference of the ratio is a function of the absolute distance from the origin. This can be easily understood by thinking of beating effects, which occur when two signals have close frequency components. Thus, by calculating the difference of such ratio, absolute position information with nanometer precision will be obtained.

FIG. 17(b) shows a method to define such a precise position of the scale origin. In this case, the end of the grating forms a flat surface. From Equation (1), it is clear that the output from the amplitude detector (AD in FIG. 3(b)) will become zero as the center of the probe oscillation moves from the grating area to the flat surface area. Thus, the position of the absolute origin can be defined by monitoring the amplitude of high frequency components in the output voltage $V_{out}$. With a combination of the two grating methods illustrated in FIG. 17(a) and the origin determination method, a complete absolute position measurement becomes possible.

FIG. 24, moreover, is a diagram showing a method for obtaining an absolute position measurement with a single probe, oscillating in the X direction and in the Y direction at the same time over the two grating surfaces, interchangeably. The absolute position is obtained after comparing the ratio between the distance off the nearest crest and the grating period at each grating area.

If the grating surface has a slightly sloped surface to the probe oscillation plane, the origin of the probe coordinate will change its relative position from the grating coordinate once the probe actuator moves in the Z direction, which will cause error of the position measurement. Thus it is important to know the angle in order to effect proper correction. FIG. 18 shows a method of measuring such angle. In this case, the grating surface and the micromachined probe surface are used as a simple optical mirror for the laser or LED light source. As the figure shows, the differential light intensity through the photo detector with two-sectioned area will represent the probe motion in the X direction as well as the angle between the grating surface and the probe oscillation plane.

This invention, therefore, enables the angle measurement without employing extra angle sensors. Since the slope α of the grating surface causes the additional term $\alpha r \sin(\omega t)$ in the output voltage $V_{out}$ described in Equation (1), the amplitude of $\sin(\omega t)$ and $\sin(3\omega t)$ components will become $$E = \alpha r - 2A\sin(\omega' X_0) J_1(r\omega')$$

$$F = -2A\sin(\omega' X_0) J_3(r\omega') \qquad (18)$$

As a result, the output signal, $$E - F \frac{J_1(r\omega')}{J_3(r\omega')} = \alpha r$$

represents the slope α. Of course, if the sample surface is simply flat, one has to measure only the amplitude of $\sin(\omega t)$ components to obtain the slope α. Since this method is very sensitive to angle change, it is highly useful for general purpose angle sensing, as well.

For the previously described phase detection schemes, moreover, it is convenient to choose the probe oscillation radius so that it satisfies $J_{p(i)}(r\omega') = J_{q(i)}(r\omega')$ for a particular i as described before. It is not an easy task, however, to know the exact probe oscillation amplitude. The present invention provides an improvement here, also, which allows precise measurement without employing any external probe displacement sensor.

For example, from Equation (1), the amplitude of the $\sin(2\omega t)$ and the $\sin(4\omega t)$ are expressed as:

$$A = 2A\cos(\omega' X_0) J_2(r\omega')$$

$$B = 2A\cos(\omega' X_0) J_4(r\omega') \qquad (19)$$

Thus, the output signal $$\frac{A}{B} = \frac{J_2(r\omega')}{J_4(r\omega')} \qquad (20)$$

represents the function of the probe oscillation amplitude r.

If the electrical scanning speed of the sensor electrodes is v, the output voltage $V_{out}$ through the tunneling current amplifier can be described as:

$$V_{out} = -V_0 + A\cos[\omega'\{vcos(\theta t) + X_0(t)\}] \qquad (21)$$

assuming that the probe coordinate is fixed to the first probe electrode. If the position of the last electrode is $$x = \frac{2\pi}{\omega'} \cdot \frac{n-1}{n},$$

the position $X_0$ can be extracted by feeding $V_{out}$ into the phase detector PD in FIG. 3(b). n is the number of the probe electrodes.

FIG. 20(a) shows a method/device of high speed probe scanning. Multiple probe electrodes are formed on the probe structure, which are connected to individual I-V converters. The multiple electrodes are positioned so that they are slightly tilted against grating crest/valley line. Thus by scanning (multiplexing) each I-V converter's output voltage electronically, an ultra fast position measurement system is obtained. FIG. 20(b) explains another advantage of this invention. Electrical pulse timings are generated so that the output voltages from I-V converters are scanned with the same time interval. This is equivalent of moving a single probe at a constant speed in only one direction. Thus, the multiplexed signal output indicates $\sin(\omega v t + \omega X0)$ where $\omega$ is a spatial frequency of the grating, v is the scanning speed and X0 is the position to be measured. As it should be clear, the phase information represents the position, which can be easily extracted by the phase detection circuit.

FIG. 21 shows another configuration of a multiple electrode (probe) position detection device. Unlike the construction shown in FIG. 20, this modification uses layered electrodes to form a stack of adjacent multiple probes.

Further modifications will also occur to those skilled in this art, and such are considered to fall within the spirit and scope of this invention as defined in the appended claims.

What is claimed is:

1. A method of real-time nanometer scale position location measurement of a probe scanning a periodically undulating surface as the surface and probe are relatively moved, that comprises the steps of setting up a sensing field between the probe and the surface; oscillating the probe during said scanning about a reference origin point of the probe by a controlling sinusoidal voltage; measuring the sinusoidal voltage generated by the sensing field during said oscillation and after passing to the surface; comparing the phase and amplitude of the controlling and generated voltages by multiplying said generated sinusoidal voltage by said controlling sinusoidal voltage; developing from such comparing, positional signals, on a continual basis, indicative of the direction and distance of the probe off the apex of the nearest undulation of the surface, and thus the position of the probe along the surface and eliminating any phase delay between the controlling sinusoidal voltage and the actual probe oscillation.

2. A method as claimed in claim 1, and in which the phase delay elimination is effected by monitoring the actual oscillation displacement of the probe and controlling a frequency synthesizer in response to such monitoring to provide a sinusoidal signal synchronized with such oscillation; and further comprising the steps of using the synchronized signal in said multiplying instead of the controlling sinusoidal voltage.

3. A method as claimed in claim 1 and in which the positional signals are fed back to control the relative movement of the probe and said surface.

4. A method as claimed in claim 1 and in which the center position of the probe oscillation is controlled such that the output signal after phase detection for such center position is adjusted always to be $n\pi$ or $\pi/2+n\pi$.

5. A method as claimed in claim 1 and in which a pair of oscillating spaced probes is employed, one for obtaining positional signals along one dimension such as the X axis, and the other oscillated at the same frequency as the said one probe but with different phase along an orthogonal dimension such as the Y axis.

6. A method as claimed in claim 5 and in which the probes are positioned diagonally of one another relative to the direction of motion over the surface.

7. A method as claimed in claim 1 and in which a pair of spaced similarly oscillating probes is employed.

8. A method as claimed in claim 7 and in which the scanning is effected for one-dimensional positional measurement wherein each probe is oscillated along said dimension.

9. A method as claimed in claim 7 and in which the pair of probes are oscillated over a pair of adjacent gratings having slightly different periods, and further comprising steps of developing different ratio values in the distance off the nearest surface undulation crest and each grating period, and calculating the difference in such ratio values to provide absolute position information.

10. A method as claimed in claim 1 and in which the probe-to-surface gap is monitored, with signals generated therefrom, and fed back to prevent the probe from crashing into the surface.

11. A method as claimed in claim 10 and in which the monitoring comprises the step of holding the maximum output voltage, corresponding to a peak in the surface, somewhat longer than one cycle of the probe oscillation, and feeding that voltage back to control the probe-to-surface minimum gap.

12. A method as claimed in claim 11 and in which the holding is then reset for the next peak of the surface.

13. A method as claimed in claim 10 and in which the output signal vs. gap is non-linearly mapped, rising steeply for minimum gap, and the output signal from such mapping is used as the fed back signal.

14. A method as claimed in claim 1 and in which the probe is formed as by micromachining into a spear-head like shape.

15. A method as claimed in claim 14 and in which metal film electrode surfaces are applied to the probe.

16. A method as claimed in claim 15 and in which the probe is made from a crystal wafer as of silicon to serve as a monolithic probe sensor/actuator.

17. A method as claimed in claim 16 and in which the probe is connected as a part of an electronic oscillator circuit.

18. A method as claimed in claim 14 and in which the probe tip is symmetrically thinned as a blade with slight curvature.

19. A method as claimed in claim 1 and in which the probe is oscillated over a pair of adjacent grating surfaces in both the X and Y directions at the same time, and further comprising the step of comparing the ratios between distance off the nearest surface undulation crest and the grating period at each grating to provide absolute position information.

20. A method as claimed in claim 1 and in which the probe is oscillated in a plane over a grating surface sloped slightly to such plane, and the angle of slope is measured by reflecting light from the probe and the grating and further comprising the step of detecting differential reflected light intensity.

21. A method as claimed in claim 1 and in which the probe is provided with multiple sets of probe electrodes each developing scanning current output signals, and multiplexing or simultaneously converting the multiple current signals to corresponding output sinusoidal voltages for developing the positional signals.

22. A method as claimed in claim 21 and in which the probe is formed with successive layered electrodes to form a stack of adjacent multiple probes.

23. A method of real-time nanometer scale position measurement of a tunneling microscope sensor probe tracking an atomic surface as the surface and probe are relatively moved, that comprises, the steps of setting up a tunneling current between the probe and the atoms of the surface; oscillating the probe during said tracking about a reference origin point of the probe by a controlling sinusoidal voltage; measuring the sinusoidal voltage generated by the tunneling current during said oscillation and after passing through atoms of the surface; comparing the phase and amplitude of the controlling and generated voltages by multiplying said generated sinusoidal voltage by said controlling sinusoidal voltage; and developing from such comparing, positional signals, on a continual basis, indicative of the direction and distance of the probe off the apex of the nearest atom of said surface, and thus the position of the probe along the surface; and eliminating any phase delay between the controlling sinusoidal voltage and the actual probe oscillation.

24. A method of real-time nanometer scale position location measurement along a surface having one of successive periodically undulating alternate physical, electrical or magnetic peaks and valleys, of a probe scanning the surface as the probe and surface are relatively moved, that comprises, the steps of setting up a sensing field between said probe appropriate for one of respective physical, electrical and magnetic sensing and the surface; oscillating the probe during said scanning about a reference origin point of the probe by a controlling sinusoidal voltage; measuring the sinusoidal voltage generated by the sensing field during said oscillation and after passing to the surface; comparing the phase and/or amplitude of the controlling and generated voltages by multiplying said generated sinusoidal voltage by said controlling sinusoidal voltage; and developing from such comparing, positional signals, on a continual basis, indicative of the direction and distance of the probe off the nearest peak of the surface, and thus the position of the probe along the surface; and eliminating any phase delay between the controlling sinusoidal voltage and the actual probe oscillation.

25. Apparatus for real-time nanometer position measurement of a sensor probe scanning a periodically undulating surface as the surface and the probe are relatively moved, having, in combination with said probe, means for setting up a current between the probe and the surface; means operable during said scanning for oscillating the probe about a reference origin point of the probe by a controlling sinusoidal voltage; means for measuring the sinusoidal voltage generated by the current during said oscillating and after passing to the surface; means for comparing the phase and amplitude of the controlling and generated voltages by means for multiplying said generated sinusoidal voltage by said controlling sinusoidal voltage; means for developing, from such comparing, positional signals on a continual basis, indicative of the direction and distance of the probe off the apex of the nearest atom or undulation of the surface, and thus the position of the probe along the surface; and means for eliminating any phase delay between the controlling sinusoidal voltage and the actual probe oscillation.

26. Apparatus as claimed in claim 25, and in which the phase delay elimination means comprises a circuit for monitoring the actual oscillation displacement of the probe, and a frequency synthesizer responsive to such monitoring to provide a sinusoidal synthesized signal synchronized with such oscillation; and further comprising means for feeding the synchronized signal into said multiplying means instead of the controlling sinusoidal voltage.

27. Apparatus as claimed in claim 26, and in which the frequency synthesizer employs a phase lock loop.

28. Apparatus as claimed in claim 25 and further comprising a feedback circuit provided for feeding the positional signals back to control the relative movement of the probe and surface.

29. Apparatus as claimed in claim 25 and further comprising means provided for controlling the reference origin point of the probe oscillation such that the output signal after phase detection for such origin point is adjusted always to be $n\pi$ or $\pi/2+n\pi$.

30. Apparatus as claimed in claim 25 and further comprising a pair of oscillating spaced probes provided, one for obtaining positional signals along one dimension such as the X axis, and the other oscillated at the same frequency as the said one probe but with different phase along an orthogonal dimension such as the Y axis.

31. Apparatus as claimed in claim 30 and in which the probes are positioned diagonally of one another relative to the direction of motion over the surface.

32. Apparatus as claimed in claim 25 and further comprising a pair of spaced similarly oscillating probes.

33. Apparatus as claimed in claim 32 and in which the scanning is effected for one-dimensional positional measurement by means for oscillating each probe along said dimension.

34. Apparatus as claimed in claim 32 and in which the probes of the pair of probes are oscillated over a pair of adjacent gratings having slightly different periods, developing different ratio values in the distance off the nearest surface undulation apex and each grating period, with the difference in such ratio values providing absolute position information.

35. Apparatus as claimed in claim 25 and in which means is provided for monitoring the probe-to-surface gap and generating signals therefrom, and means for feeding back such signals to prevent the probe from crashing into the surface.

36. Apparatus as claimed in claim 35 and in which the monitoring means comprises a circuit for holding the maximum output voltage, corresponding to an apex in the surface, somewhat longer than one cycle of the probe oscillation, and means for feeding that voltage back to control the probe-to-surface minimum gap.

37. Apparatus as claimed in claim 36 and in which a reset is provided for the holding circuit to reset for the next apex of the surface.

38. Apparatus as claimed in claim 35 and in which means is provided for non-linearly mapping the output signal vs. gap, rising steeply for minimum gap, and the output signal from such mapping is used as the feed back signal.

39. Apparatus as claimed in claim 25 and in which the probe is formed as by micromachining into a spear-head like shape.

40. Apparatus as claimed in claim 39 and in which metal film electrode surfaces are applied to the probe.

41. Apparatus as claimed in claim 40 and in which the probe is made from a crystal wafer as of silicon to serve as a monolithic probe sensor/actuator.

42. Apparatus as claimed in claim 41 and in which the probe is connected as a part of an electronic oscillator circuit.

43. Apparatus as claimed in claim 39 and in which the probe tip is symmetrically thinned as a blade with slight curvature.

44. Apparatus as claimed in claim 25 and in which the probe is oscillated over a pair of adjacent grating surfaces in both the X and Y directions at the same time, with the ratios between distance off the nearest surface undulation apex and the grating period at each grating providing absolute position information.

45. Apparatus as claimed in claim 25 and in which the probe is oscillated in a plane over a grating surface sloped slightly to such plane, and further comprising means provided for measuring the angle of slope computing comprising means for reflecting light from the probe and the grating and means for detecting the resulting differential reflected light intensity.

46. Apparatus as claimed in claim 25 and in which the probe is provided with multiple sets of probe electrodes each developing scanning current output signals, and means for multiplexing or simultaneously converting the multiple current signals to corresponding output sinusoidal voltages for developing the positional signals.

47. Apparatus as claimed in claim 46 and in which the probe is formed with successive layered electrodes to form a stack of adjacent multiple probes.

48. Apparatus as claimed in claim 25 and in which the probe is formed with successive layered electrodes to form a stack of adjacent multiple probes.

* * * * *